United States Patent
Regan

(10) Patent No.: US 9,992,734 B2
(45) Date of Patent: *Jun. 5, 2018

(54) SYSTEMS AND METHODS FOR DEPLOYING, CONTROLLING, AND MANAGING WIRELESS COMMUNICATION EQUIPMENT

(71) Applicant: RF Venue, Inc., Ashland, MA (US)

(72) Inventor: Christopher John Regan, Somerville, MA (US)

(73) Assignee: RF Venue, Inc., Ashland, MA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/202,413

(22) Filed: Jul. 5, 2016

(65) Prior Publication Data

US 2016/0316422 A1    Oct. 27, 2016

Related U.S. Application Data

(63) Continuation-in-part of application No. 13/833,398, filed on Mar. 15, 2013, now Pat. No. 9,386,510.

(51) Int. Cl.
*H04W 40/00* (2009.01)
*H04W 48/16* (2009.01)
(Continued)

(52) U.S. Cl.
CPC .......... *H04W 48/16* (2013.01); *H04B 1/0003* (2013.01); *H04W 24/02* (2013.01)

(58) Field of Classification Search
CPC ... H04W 88/08; H04W 72/082; H04W 16/14; H04W 72/0453; H04W 76/025;
(Continued)

(56) References Cited

U.S. PATENT DOCUMENTS

| | | |
|---|---|---|
| 5,752,164 A | 5/1998 | Jones |
| 5,886,988 A | 3/1999 | Yun et al. |

(Continued)

FOREIGN PATENT DOCUMENTS

| | | |
|---|---|---|
| EP | 1282336 A2 | 2/2003 |
| WO | WO-2012036640 A1 | 3/2012 |

OTHER PUBLICATIONS

International Search Report and Written Opinion issued by the U.S. Patent and Trademark Office as International Searching Authority for International Application No. PCT/US14/22536 dated Oct. 22, 2014 (14 pgs.).

(Continued)

*Primary Examiner* — Tu X Nguyen
(74) *Attorney, Agent, or Firm* — Wolf, Greenfield & Sacks, P.C.

(57) ABSTRACT

Systems and methods are provided for analyzing radio frequency (RF) data. RF data is received from one or more RF sensors, wherein the RF data is collected over a particular frequency range and resolution bandwidth. One or more frequencies not in use are determined based on the RF data and a signal level threshold. One or more recommended frequencies for use are calculated based on the one or more open frequencies and an intermodulation function, wherein each of the one or more recommended frequencies reduces a potential for intermodulation distortion than other frequencies in the frequency range.

20 Claims, 33 Drawing Sheets
(28 of 33 Drawing Sheet(s) Filed in Color)

(51) Int. Cl.
*H04W 24/02* (2009.01)
*H04B 1/00* (2006.01)

(58) Field of Classification Search
CPC ..... H04W 84/18; H04W 72/02; H04W 72/04; H04W 72/0426; H04W 84/045; H04W 88/02; H04W 48/16; H04W 72/005; H04W 48/14
USPC .......................................... 455/450, 451, 446
See application file for complete search history.

(56) References Cited

U.S. PATENT DOCUMENTS

| | | |
|---|---|---|
| 9,386,510 B2 | 7/2016 | Regan |
| 2003/0036357 A1 | 2/2003 | McGowan |
| 2004/0166900 A1* | 8/2004 | Qiu ...................... H04W 72/02 455/560 |
| 2006/0019679 A1 | 1/2006 | Rappaport et al. |
| 2009/0296641 A1 | 12/2009 | Bienas et al. |
| 2009/0316649 A1* | 12/2009 | Chen ..................... H04W 24/02 370/331 |
| 2010/0124886 A1 | 5/2010 | Fordham et al. |
| 2010/0144278 A1 | 6/2010 | VanHarlingen et al. |
| 2010/0156438 A1 | 6/2010 | Gorin et al. |
| 2012/0008514 A1 | 1/2012 | Ponnuswamy |
| 2012/0108282 A1 | 5/2012 | Li et al. |
| 2012/0134280 A1 | 5/2012 | Rotvold et al. |
| 2012/0221271 A1 | 8/2012 | Berg et al. |
| 2014/0254392 A1 | 9/2014 | Wolcott et al. |
| 2014/0274184 A1 | 9/2014 | Regan |

OTHER PUBLICATIONS

European Extended Search Report issued in EP14768617, dated Sep. 29, 2016 (10 pages).

* cited by examiner

| Type of device | Manufacturer | Model | Frequency "band" | Range (MHz) |
|---|---|---|---|---|
| Wireless Microphone | Audio Technica | 3000 Series | Band C | 541.5 - 566.375 |
| Wireless Microphone | Audio Technica | 3000 Series | Band D | 655.500 - 680.375 |
| Wireless Microphone | Audio Technica | 3000 Series | Band C | 541.5 - 566.375 |
| Wireless Microphone | Audio Technica | 3000 Series | Band D | 655.5 - 680.375 |
| Wireless Microphone | Sennheiser | EW100 | Band A | 516.000 - 558.000 |
| Wireless Microphone | Sennheiser | EW100 | Band B | 626.000 - 668.000 |
| Wireless Microphone | Sennheiser | EW100 | Band C | 734 - 775.850 |
| Wireless Microphone | Sennheiser | EW100 | Band E | 823 - 861.900 |
| Wireless Microphone | Sennheiser | EW300 | Band G | 566.000 - 608.000 |
| Wireless Microphone | Sennheiser | EW300 | Band GB | 606.475 - 648 |
| Wireless Microphone | Shure | BLX | Band H8 | 518.125 - 541.85 |
| Wireless Microphone | Shure | BLX | Band J10 | 584.15 - 607.875 |
| Wireless Microphone | Shure | BLX | Band K12 | 614.15 - 637.875 |

FIG 17.

Equipment 1801.

Notes 1803.

Export scan data to CSV format for integration with Shure's Wireless Workbench or Professional Wireless' iAS 1805.

Signal Level Threshold 1807. −80 dBm

1809.

| Frequency MHz | Manufacturer | Model | Device Type |
|---|---|---|---|
| 525.50 | Shure | ULX-D | Wireless Microphone |
| 528.50 | Shure | ULX-D | Wireless Microphone |
| 534.50 | Shure | UHF-R | Wireless Microphone |
| 535.50 | Shure | UHF-R | Wireless Microphone |
| 560.00 | Sennheiser | EW-300 | IEM |
| 562.50 | Sennheiser | EW-300 | IEM |
| 571.50 | Sennheiser | EW-300 | IEM |

FIG 18.

SYSTEMS AND METHODS FOR DEPLOYING, CONTROLLING, AND MANAGING WIRELESS COMMUNICATION EQUIPMENT

CROSS-REFERENCE TO RELATED APPLICATIONS

This application claims the benefit of, and is a continuation-in-part of, U.S. patent application Ser. No. 13/833,398, filed on Mar. 15, 2013 and entitled "Systems and Methods for Deploying, Controlling, and Managing Wireless Communication Equipment," the contents of which are hereby incorporated by reference in their entirety.

TECHNICAL FIELD

Embodiments of the invention generally relate to deploying, controlling and managing wireless communication equipment, and more specifically to wireless audio system design, deployment, control and management, including spectrum measurement for the coordination and deployment of wireless audiovisual equipment or other wireless communication devices.

BACKGROUND

Conventional radio frequency spectrum analysis equipment such as scanners, software defined radios, and network analyzers are often used to sweep the radio frequency spectrum in a venue to assist in coordination of wireless systems. High accuracy systems usually require trained engineers to operate but are too costly for the majority of wireless audiovisual equipment operators. Further, conventional spectrum analyzers are commonly used on a temporary basis and are unable to account for intermittent occupation of radio frequencies in the venue over time. Houses of worship, entertainment venues, convention centers, or broadcast facilities, for example, are highly dynamic radio frequency environments with many transmission sources in transit. This can account for significantly different signal levels measured during audio system setup compared to during live operation at showtimes, which exacerbates interference problems and coordination complexity.

There is therefore a need for the strategic deployment, control and management of wireless communication equipment that performs reliably during real-time operation.

SUMMARY

In accordance with embodiments of the present invention, systems, methods, and non-transitory computer-readable media are provided such that novice users untrained in radio frequency measurement and analysis can access real time and historical spectrum data to gain an accurate understanding of a facility's radio frequency activity to maximize spectrum efficiency and ensure high reliability for all users.

An embodiment of the present invention includes a computerized method for analyzing radio frequency (RF) data. The method includes receiving, by a computing device, RF data from one or more RF sensors, wherein the RF data is collected over a particular frequency range and resolution bandwidth. The computing device determines one or more frequencies not in use based on the RF data and a signal level threshold. The computing device calculates one or more recommended frequencies for use based on the one or more open frequencies, wherein each of the one or more recommended frequencies reduces a potential for interference than other frequencies in the frequency range.

An embodiment of the present invention includes a server for analyzing radio frequency (RF) data. The server includes a processor configured to run a module stored in memory that is configured to cause the processor to receive RF data from one or more RF sensors, wherein the RF data is collected over a particular frequency range and resolution bandwidth. The module stored in memory is configured to cause the processor to determine one or more frequencies not in use based on the RF data and a signal level threshold. The module stored in memory is configured to cause the processor to calculate one or more recommended frequencies for use based on the one or more open frequencies, wherein each of the one or more recommended frequencies reduces a potential for interference than other frequencies in the frequency range. The module stored in memory can be configured to calculate the reference frequencies of a plurality of venues.

An embodiment of the present invention includes a non-transitory computer readable medium having executable instructions operable to cause an apparatus to receive RF data from one or more RF sensors, wherein the RF data is collected over a particular frequency range and resolution bandwidth. The instructions are operable to cause the apparatus to determine one or more frequencies not in use based on the RF data and a signal level threshold. The instructions are operable to cause the apparatus to calculate one or more recommended frequencies for use based on the one or more open frequencies, wherein each of the one or more recommended frequencies reduces a potential for interference than other frequencies in the frequency range.

The techniques disclosed herein can provide for radio frequency measurement and analysis equipment that is lower in cost and easier to use than typical radio frequency measurement equipment. The techniques can provide continuous monitoring for more accurate coordination among devices, and can be deployed and operated by novice users. Further, a broad network of the devices described herein can enable spectrum managers, facility owners, system integrators, and device manufacturers to deploy new equipment tailored for the RF environment in which it can be used. The software application and hardware sensor network disclosed herein can provide historical and real time frequency coordination information alongside system design parameters which can, for example, reduce design costs, installation costs, and optimize real time system performance at low cost.

These and other capabilities of the embodiments of the present invention will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various objectives, features, and advantages of the embodiments of the present invention can be more fully appreciated with reference to the following detailed description of the embodiments of the present invention when considered in connection with the following drawings, in which like reference numerals identify like elements.

FIG. 17 is an example equipment profile database for a web application interface, in accordance with embodiments of the present invention;

FIG. 18. is an exemplary web application interface incorporating an equipment profile, user notation form, data export function, and intermodulation distortion calculator with signal level threshold setting, in accordance with embodiments of the present invention;

DETAILED DESCRIPTION

Figure 1:
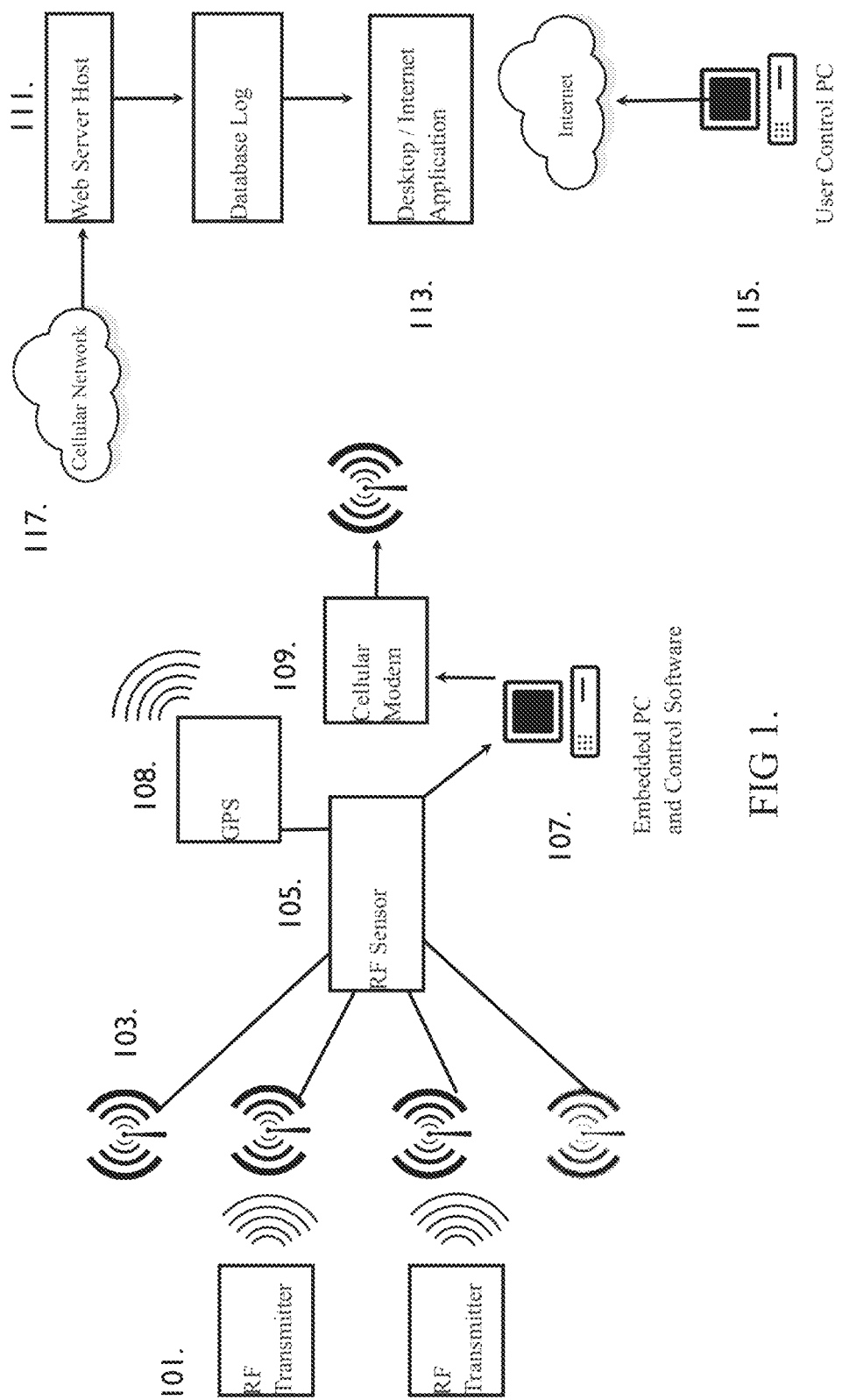
FIG. 1 is an exemplary diagram of a system for deploying, controlling and managing wireless communications equipment, in accordance with embodiments of the present invention.

In the following description, numerous specific details are set forth regarding the systems and methods of the embodiments of the present invention and the environment in which such systems and methods may operate, etc., in order to provide a thorough understanding of the embodiments of the present invention. It will be apparent to one skilled in the art, however, that the embodiments of the present invention may be practiced without such specific details, and that certain features, which are well known in the art, are not described in detail in order to avoid unnecessary complication of the embodiments of the present invention. In addition, it will be understood that the embodiments provided below are exemplary, and that it is contemplated that there are other systems and methods that are within the scope of the embodiments of the present invention.

In some embodiments, a web-based analytics and system design application is paired with a network of remote radio frequency sensors. Users access the system for the purpose of designing, monitoring, controlling, coordinating, or optimizing deployment of wireless communication equipment such as microphones. Internet-connected RF sensors are deployed on an ad-hoc basis for scheduled events, or installed permanently for ongoing spectrum management in one or more rooms in a facility.

The systems and methods described below include, in some embodiments, an internet-accessible database and user interface web application for analysis of radio frequency activity from a network of internet connected RF sensors. The systems and methods further embody or include system design optimization and coordination of wireless communication systems in dynamic RF environments such as, for example, tradeshows, live concerts, and multi-purpose facilities. Real-time wireless communication systems such as wireless microphones, intercoms, in-ear monitors, conferencing systems and the like are highly susceptible to signal dropouts, intermodulation distortion, or signal interference from third party transmission sources. Interference events or signal dropouts create distracting audio effects and negatively impact public speakers, audiences, and event producers. These issues are further complicated at high value events such as live television broadcasts, live sports, or theater events. It is therefore critical that wireless audio systems be properly tuned to open channels and coordinated with local transmission sources to ensure reliable operation. The systems and methods of the embodiments of the present invention use inexpensive distributed RF sensors to map operating environments for novice users in order to reduce the probability of interference events and provide a common online portal for all wireless stakeholders in the facility.

Each remotely controlled RF sensor comprises an RF scanning circuit with an external antenna input and data port to connect to the internet via cellular modem or local area network connection. The RF sensor may also comprise a logic board, display driver, graphic interface, local storage medium, and battery. Via the RF sensor's network connection to the web application software, the user sends a signal to one or more RF sensors to perform a scan across a user defined frequency range with a user defined resolution bandwidth. The system may also be configured for periodic scanning to monitor changes in RF activity over time. The RF scanning circuit gathers frequency and amplitude data and transmits that data back to the remote web application for analysis and display. The web application interface dashboard is user configured with various alarms for when one or more user defined frequencies does not meet or exceeds amplitude threshold values. Amplitude threshold values may include upper or lower frequency limits of wireless audio receiver sensitivity or user defined frequency values configured to limit the number of alarm events to severely high or low frequency levels. From the web application dashboard the remote user may switch between RF sensors to view different venues or areas in the facility. In one embodiment, the application may overlay multiple scans to uncover least congested sections of spectrum over time. Once the user has obtained a scan or map from one or more RF sensors, the user may choose to run a frequency allocation and intermodulation program to generate a list of recommended frequencies to use in the venue. This program sets an upper limit for acceptable signal level and generates a list of open or unused frequencies based on scanned frequencies that do not meet the threshold. The program or computer implemented executable code then performs an intermodulation calculation based on the open frequencies list and third party transmitters and tabulates a set of recommended frequencies to reduce the potential for intermodulation distortion events. The intermodulation calculation takes a single frequency or group of frequencies obtained from a frequency scan, and determines their first, second, third, and/or greater harmonic frequencies. The harmonic frequencies are prioritized relative to desired device frequencies to determine a probability of interference. The program or computer implemented executable code can be configured to factor in nearby sources of transmission (e.g., such as third party wireless microphones, which appear on the frequency scan into its intermodulation calculation), rather than just among desired device channels (e.g., as is often performed in the prior art). The user may thus configure wireless audio systems more effectively given local RF conditions, and control and monitor systems over time.

In some embodiments, time-based assignment of frequencies over time can be effectuated via a web application calendar function, e.g., which maximizes planning and use of the RF spectrum resource inside a facility, providing clarity to wireless equipment operators, and minimizing interference events. By providing a global view of RF conditions (e.g., for a particular venue), stakeholder frequencies (e.g., licensed spectrum users such as broadcasters engineering technicians, or unlicensed users coordinating equipment frequencies among themselves at a live event) and/or times slots, the often chaotic RF environment is made transparent, and can be accessed more efficiently to plan allocation of spectrum(s) for wireless devices for events at the venue. Current methods of "squatting" frequencies by leaving wireless transmitters running prior to an event (e.g., to try and prevent other devices from using the frequencies because they appear to be busy) unnecessarily ties up valuable RF spectrum. Aggregated RF data from multiple GPS-located devices allows for local, regional, and wide area mapping of RF spectrum activity. This is described in further detail in conjunction with, for example, FIG. 24. Similar to the regional mapping of traffic congestion, RF scenes can contribute temporal RF data by geographic position and time to enable policy makers and spectrum stakeholders to more efficiently allocate finite spectrum resources across wide areas.

In addition to proper frequency coordination, wireless audio system components must be designed and selected to meet the criteria of receiver sensitivity for favorable performance. Antenna placement, cable loss, and signal attenuation play critical roles and vary substantially from one venue to another or from one wireless configuration to another. Too strong or too weak a signal adversely impacts performance of the system and results in undesirable yet audible side effects, dropouts in audio, or no audio at all. Wireless audio system designers often take into account many factors including desired operating range of equipment, signal attenuation through walls or floors, and length of cable runs, while managing venue owner expectations for cost and aesthetics. The systems and methods of the embodiments of the present invention use a database of common wireless equipment operating specifications, including wireless microphone systems, in-ear monitor systems, intercoms, and/or the like, categorized by product type on a user selectable list or searchable database. For example, the database may include a specific Shure brand wireless microphone model (e.g., the ULX model number), with a specific frequency range such as 554-590 MHz, with a fixed or configurable transmitter output power of 10, 20, 30, or 50 milliwatts. This device may be added to the overall user configured system to assist in the estimation of system performance and optimization of design given device performance specifications.

The system further comprises user defined floorplans and equipment positions to optimize system design prior to deployment. The systems and methods of the embodiments of the present invention estimate characteristics such as operating range by factoring transmission power and frequency with free field range measurements of known equipment, and overlays square footage coverage areas with reduced reception areas beyond walls due to building material attenuation. For example, given the broad range of building materials with different attenuation levels, each of which vary as a function of frequency, the system can be configured to estimate effective range beyond walls by de-rating free space range levels on a sliding scale based on operating frequency. The systems and methods of the embodiments of the present invention application also estimate fringe areas of reception at the outer limits of the coverage zone. This enables system designers to estimate coverage areas and test configurations. It further enables efficient use of spectrum in the facility for all users by visualizing the impact of physically spacing systems apart, reducing transmission power, and re-allocating previously occupied frequencies to adjacent systems.

Furthermore, the systems and methods of the embodiments of the present invention perform a free space loss calculation given the user defined distance between the receiving antenna and transmit antenna. Due to the high variability of multi-path nulls and cross linear polarization fades in indoor environments and for moving transmitters, the system provides a best estimate of signal level at the antenna. Once the signal level calculation is made, the user selects from various antenna types such as ½ and ¼ wave dipoles, log periodic dipole arrays, helical, yagi, local field, or polarization diversity arrays and common mounting positions. Once antenna type is selected, the user selects cable type from a list of common coaxial cables as well as cable length between the antenna and the receiver. The application adds gain level from the antenna type selected and subtracts transmission line loss based on frequency, cable type and length to tabulate the estimated RF signal level at the receiver. For a given receiver, the system determines whether the estimated signal level is adequate enough for optimal system performance. An examplary link budget equation is:

Received Power(dBm)=Transmitter Power(dBm)+ Transmitter Antenna Gain(dBi)+Receiver Antenna Gain(dB)−Transmit Feeder and Connector Losses−Free Space Path Loss(dB)−Fade Margin(dB)−Indoor/Materials Derate Factor (dB)−Transmission Line Loss(dB)−Receiver Feeder and Connector Losses.

The calculated Received Power can be measured against wireless receiver equipment sensitivity requirements to determine if the total link is adequate for successful operation.

Current frequency registration databases provide location, transmit power, and frequency of licensed television and radio broadcast facilities. Using these databases provided by the Federal Communications Commission, wireless audio users can input a zip code and receive a list of known terrestrial broadcast stations in that area. With this list users can tune their wireless audio equipment around such high powered transmitters to prevent interference. However, television stations do not represent the only sources of interference for wireless audio systems. Typically, pre-programmed wireless audio devices encounter other sources of interference once deployed onsite and require re-tuning. In addition to intermittent transmission sources, the systems and methods of the embodiments of the present invention incorporate known sources of interference such as fixed or mobile television transmitters, TV Band Devices, or the like into its RF map, giving the operator a complete view of fixed and intermittent interference sources. The RF Map function can include a list and/or geographic map view of local RF sources, such as RF sources that are registered in FCC databases such as television stations, registered wireless microphones, and/or TV Band Devices, as well as other RF sources, such as unknown or intermittent sources discovered by scan results.

The systems and methods of certain embodiments eliminate the large upfront investment of conventional spectrum analysis equipment through a network node leasing program, node rental programs, and web application subscriptions to enable low cost network access. The systems and methods of the embodiments of the invention also include custom written reports, analysis, and recommendation capability by professional broadcast engineers on behalf of network users. By providing the node on rental or subscription service basis, users can deploy systems for spectrum analysis on an ad hoc basis and at low cost.

The systems and methods of the embodiments of the invention further include distributed antenna capability at each network node, which enables a single node to switch between multiple remote antennas to monitor various areas in the venue. Another aspect of the systems and methods of the embodiments of the invention includes multiple nodes or a node with multiple remote antennas to locate transmitters by time of arrival or angle of arrival. The systems and methods of certain embodiments of the invention also comprise global positioning system modules at each node to accurately track node location and to overlay spectrum data on common internet mapping systems and facility floorplans. By giving the user an accurate and easily identifiable map overlay alongside spectrum data and system design criteria, the systems and methods of certain embodiments of the present invention provide a physical reference for various transmission source locations.

FIG. 1 is an exemplary diagram of a system for deploying, controlling and managing wireless communications equipment according to an embodiment of the present invention. Referring now to the systems and methods of certain embodiments of the invention in more detail, in FIG. 1, a wideband RF sensor circuit 105, which includes a spectrum analysis function, is shown connected to one or more antenna elements 103 which receive signals from nearby radio wave transmission sources 101. Frequency span for RF sensor 105 can be user defined such as, for example, with a lower limit of 1 megahertz and an upper limit of 18 gigahertz. In some embodiments, to observe transmission source in greater detail, scans may be performed in a narrower span of interest to wireless audio device operators such as, for example, 470-698 MHz. In some embodiments, the resolution bandwidth range may be between 30 Hz and 1 MHz. RF sensor 105 monitors frequency, amplitude, and source orientation or location data of transmission sources 101 from antenna elements 103. RF sensor 105 can alternatively record data at only user defined time intervals to reduce data throughput to remote server or to monitor intermittent transmissions which only occur over defined periods. Remote antennas 103 may be dipole type antennas, directional log periodic or yagi type antennas, or local field floorpad and ceiling tile mounted antennas. Antennas 103 can be distributed into multiple zones in the facility, connected by common coaxial cable types from spectrum analyzer 105 or alternatively via optical cable connection. Global positioning system 108 is integrated with spectrum analyzer 105 and provides common longitudinal and latitudinal location data (e.g., Global Positioning System (GPS) data) for map overlays, theft recovery, and network monitoring. Radio frequency spectrum data collected is logged by embedded PC and control software 107 and transmitted by data connection system 109 to the cellular network 117. Embedded PC and Control Software 107 may include local disk and/or flash memory storage of RF data for ad hoc retrieval by web server host 111. Data connection system 109 may be a common USB dongle or standalone cellular data modem. Alternatively data connection system 109 may be a common wireless router or switch connected to a local area network. Data connection system 109 may also be a long range point to point wireless link or long range white space router for rural deployment where no data networks are available. Remote web server 111 receives RF spectrum data from data connection system 109 and hosted web application 113 provides spectrum visualization and data analysis which can be displayed on any internet-connected device 115. Internet-connected device 115 may be any laptop or desktop computer, smartphone, tablet computer, digital sign, or information kiosk.

Embedded PC and Control Software 107 may be a desktop PC or mobile device interfaced directly with RF Sensor 105 via USB, micro-USB, ethernet and/or a tablet connector. The desktop PC or portable computing device may run Apple OSX, Android, or iOS software applications which control operation of RF Sensor 107 and can upload RF data captured by RF Sensor 107 and location data captured by GPS circuit 108 directly to internet application 113.

Figure 2:
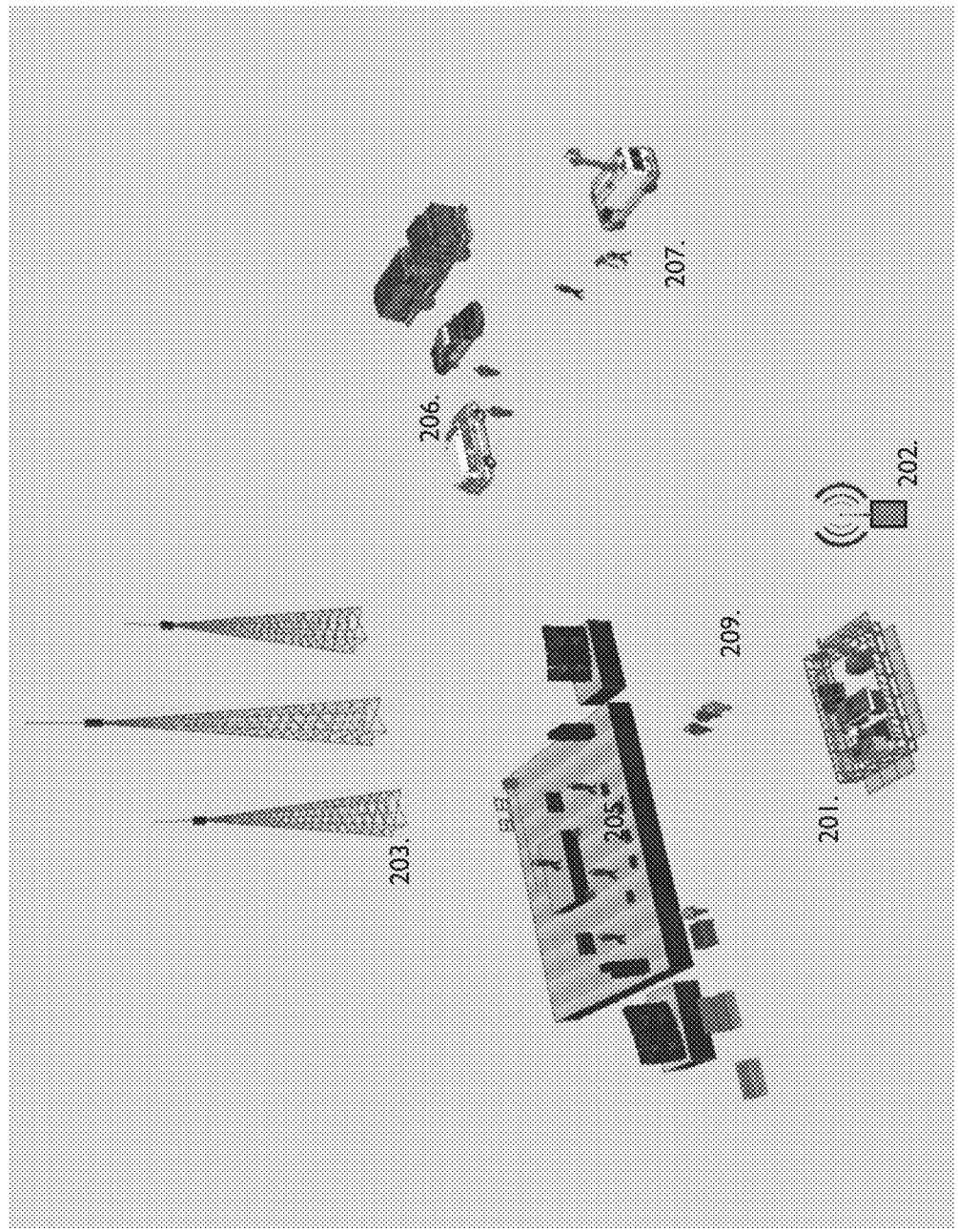
FIG. 2 is an exemplary diagram of an operating environment and typical transmission sources for deploying, controlling and managing wireless communications equipment, in accordance with embodiments of the present invention.

FIG. 2 is an exemplary diagram of an operating environment and typical transmission sources for deploying, controlling and rearranging wireless communications equipment in accordance with certain embodiments of the present invention. Referring now to FIG. 2, various types of radio frequency transmission sources 101 from FIG. 1 are shown in greater detail within the operating area of present invention remote RF sensor device 202. Wireless audio and video equipment operators 201 coordinate frequencies and monitor use for wireless microphones 205 by scanning the local environment for open frequencies (e.g., unused frequencies, or rarely used frequencies). Wireless microphones 205 may also include in-ear monitors, wireless intercoms, assisted listening systems, wireless video transmitters, two way radios, emergency alert or public safety communications (e.g. EAS) and the like. Other mobile transmitters monitored by the device 202 include mobile phones, TV band devices, Digital Enhanced Cordless Telecommunications (DECT) band devices and mobile Industrial, Scientific and Medical (ISM) band devices. Fixed terrestrial television transmitters 203 and intermittent, mobile wireless transmission sources such as public safety systems 206 or news gathering systems 207 are also monitored by the systems 202. Fixed television transmitters 203 may alternatively include fixed TV band devices, ISM band data links, point to point wireless networks and the like.

Figure 3:
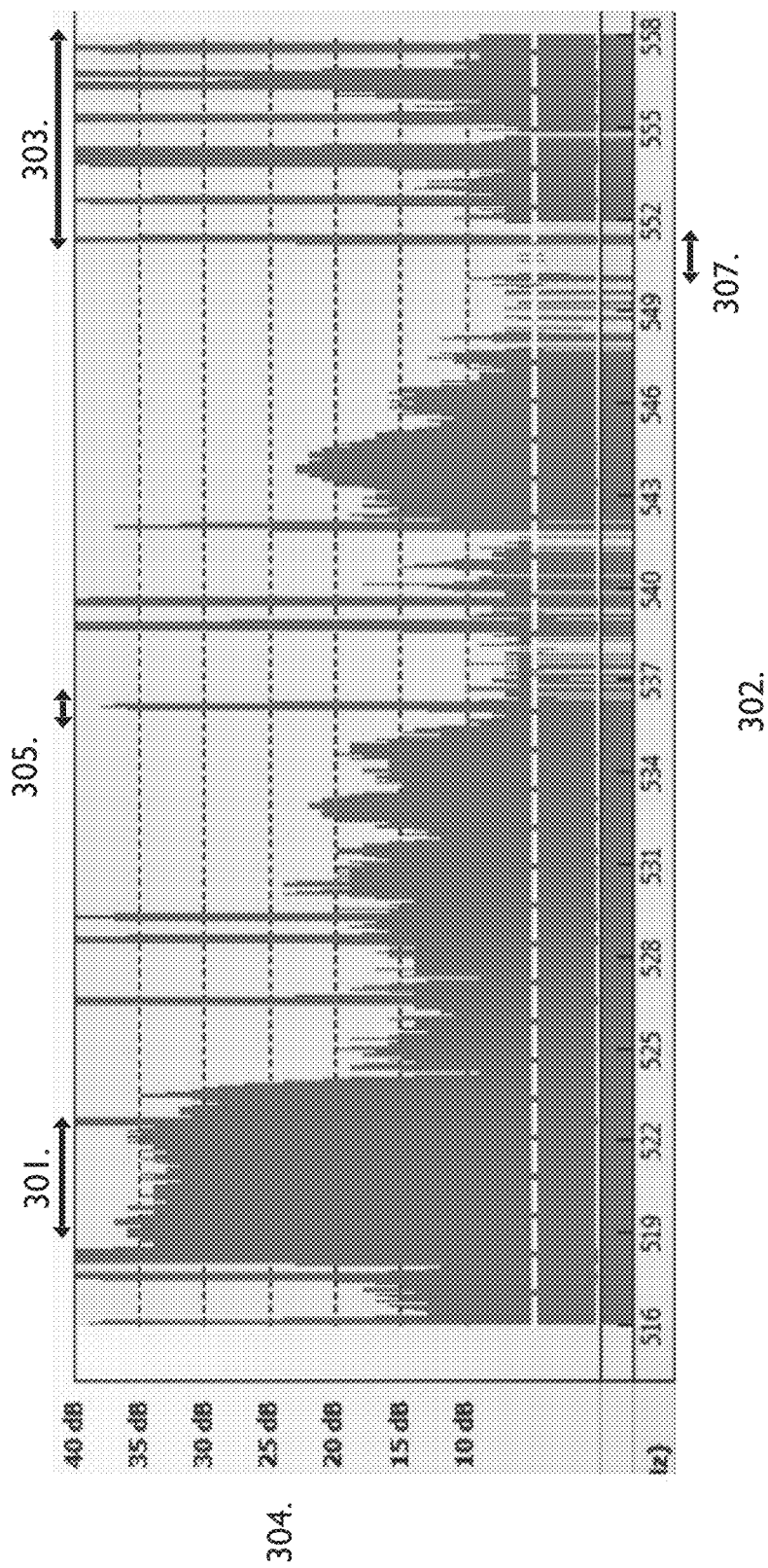
FIG. 3 is an exemplary spectral display for deploying, controlling and managing wireless communications equipment, in accordance with embodiments of the present invention.

FIG. 3 is an exemplary spectral display used for deploying, controlling and managing wireless communications equipment. Referring now to FIG. 3, there is shown in greater detail an RF spectrum analysis of a typical venue shown in FIG. 2, with frequency in megahertz along X-Axis 302 and signal amplitude in decibels along Y-Axis 304. High amplitude, wideband frequencies such as those found at 301 are typically high power transmission sources such as terrestrial television stations 203 as shown in FIG. 2. Narrowband source 305 can be wireless audio systems such as wireless microphones and other wireless devices described in FIG. 2. Large groups of wireless microphones are often coordinated together in a block of frequencies such as at 303. In highly congested RF environments, there can be very few clear channels (e.g., unused frequencies or rarely used frequencies) available such as 307. The systems and methods of the embodiments of the present invention continuously gathers and displays data such as those shown in FIG. 3 to develop location-specific RF spectrum analytics which promotes spectrum efficiency.

Figure 4:
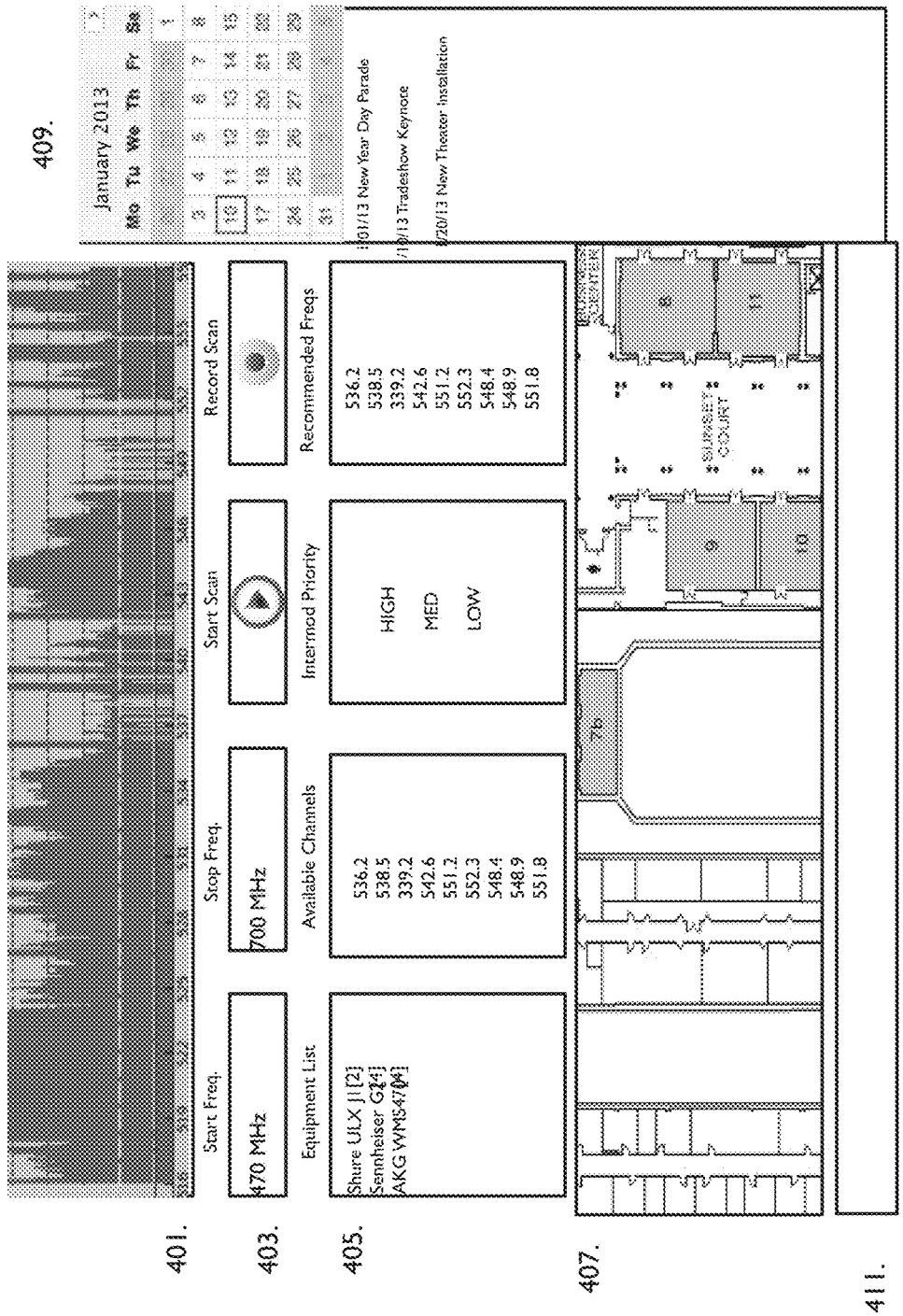
FIG. 4 is an exemplary diagram of a user interface for deploying, controlling and managing wireless communications equipment, in accordance with embodiments of the present invention.

FIG. 4 is an block diagram of a user interface for deploying, controlling and managing wireless communications equipment in accordance with systems and methods of certain embodiments of the present invention. Referring now to FIG. 4, there is shown in greater detail the user interface for the system's 113 hosted web application from FIG. 1. A common frequency-amplitude plot 401 is shown as in FIG. 3, with various input fields 403 for device control including center frequency, start-stop frequency range, pause scan, or record and recall time period. User interface section 405 of the embodiments of the present invention displays information for the user including available frequencies, recommended frequencies, intermodulation calculation settings, and logged alarm events or unauthorized activity.

User interface 405 may be interactive and capable of setting alarm levels at specific frequencies or overlaying device names and types by user input fields. Interface 405 may have alternate data display types including waterfall or heat map type. Interface 407 can display, for example, a floorplan showing distances and remote antenna placement with cable lengths 407 can display a map overlay of device location, with heat map or other overlays of RF activity by location gathered from one or more spectrum analyzers in the area.

Section 409 of the user interface displays saved scans taken at various intervals or over various periods for recall and analysis. Section 409 may also comprise a calendar function to reserve, manage, and allocate frequencies for future events. Multiple RF spectrum stakeholders may collaborate in the web application to coordinate frequencies and assign channels for future use from a shared calendar view 409 and equipment list 405. Summary equipment, frequency, and channel assignment data compiled in the web application may be exported to a PDF or other common file format reports. RF scan data 401 may be exported to a CSV file for import to third party wireless applications, such as Shure® Wireless Workbench. Section 411 may be a series of dropdown menus to select specific equipment models or system design characteristics such as transmit output power, distance from transmit position to receive antenna, type of antenna, type and length of transmission line, receiver sensitivity and the like. Section 411 may alternatively output transmission line loss calculation, path loss, or signal level estimations at the receiver based user input venue parameters. The user interface of certain embodiments may also include export functions of various common file types including purchased reports and detailed expert analysis. Frequency and amplitude data with intermodulation calculations may be exported into various file formats for import to wireless transmitters to coordinate multi-channel constellation systems.

Figure 5:
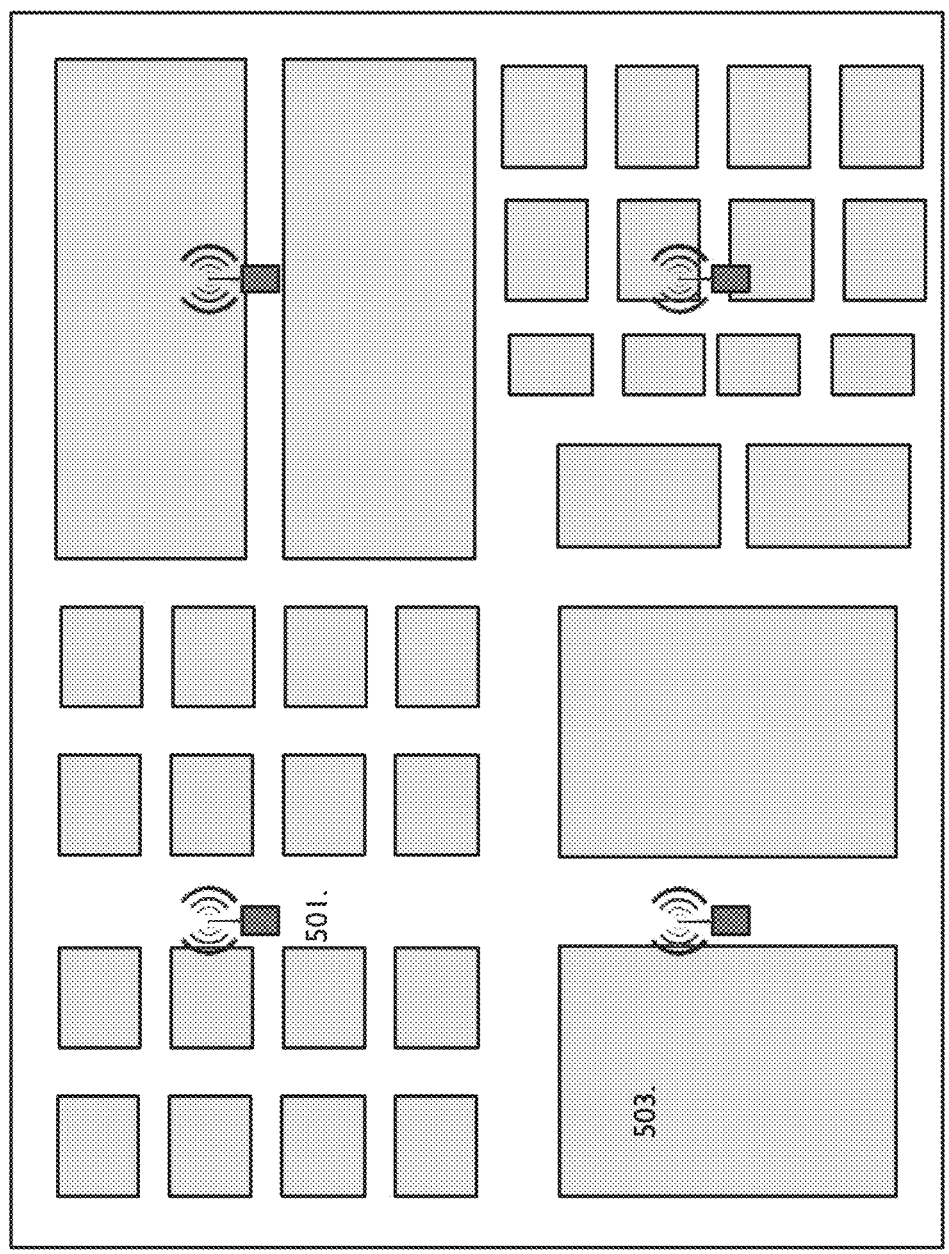
FIG. 5 is an exemplary diagram of an array of spectrum analyzers of a system for deploying, controlling and managing wireless communications equipment, in accordance with embodiments of the present invention.

FIG. 5 is an exemplary diagram of an array of spectrum analyzers for deploying wireless communications equipment. Referring now to FIG. 5, a plurality of remote controlled RF sensors 501 is shown within a large convention center with tradeshow exhibitor areas 503 of various square footage. Each shaded box 503 represents a separate trade show exhibitor area which may use wireless audio systems. The systems and methods of certain embodiments include multiple spectrum analyzers in a facility to provide a more complete analysis and to physically locate transmission sources. In facilities with high spectrum congestion, the systems may enable facility owners to manage third party device frequency, transmission periods, transmission output power settings, antenna positioning, and the like which promote spectrum efficiency and reliability for all users in the facility.

Figure 6:
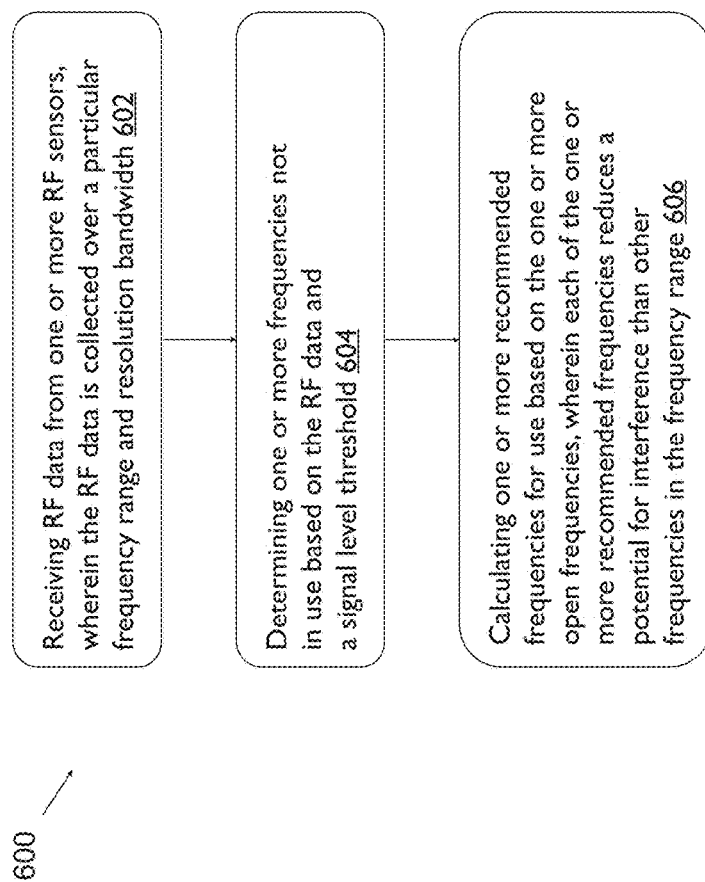
FIG. 6 is an exemplary method for calculating one or more recommended frequencies for deploying, controlling and managing wireless communications equipment, in accordance with embodiments of the present invention.

FIG. 6 is an exemplary method for calculating one or more recommended frequencies for deploying, controlling and managing wireless communications equipment, in accordance with embodiments of the present invention. Referring to FIG. 1, at step 602, remote web server 111 receives RF data from one or more RF sensors 105. The RF data is collected over a particular frequency range and resolution bandwidth. For example, the RF data can be collected over a frequency range with a lower limit of 1 megahertz and an upper limit of 18 gigahertz. In some embodiments, to observe transmission source in greater detail, scans may be performed in a narrower span of interest to wireless audio device operators such as 470-698 MHz. An exemplary typical resolution bandwidth range may be between 30 Hz and 1 MHz. At step 604, the remote web server 111 determines one or more frequencies not in use based on the received RF data and a signal level threshold. The signal level threshold can be, for example, an amplitude level threshold based on an equipment specification minimum to prevent signal dropout or maximum to prevent receiver circuit distortion.

At step 606, the remote web server 111 calculates one or more recommended frequencies for use based on the one or more open frequencies. In some examples, the remote web server 111 calculates one or more recommended frequencies for use based on the one or more open frequencies and an intermodulation function. The intermodulation function can compute, for example, first, second, third and/or greater harmonics and factor those additional sideband frequencies into overall frequency coordination. Each of the one or more recommended frequencies reduces a potential for interference (e.g., intermodulation distortion) compared to other frequencies in the frequency range. For example, referring to FIG. 3, the remote web server 111 can calculate clear channel 307 as a recommended frequency, which reduces a potential for interference compared to frequencies 301, 303 and 305.

Figure 7:
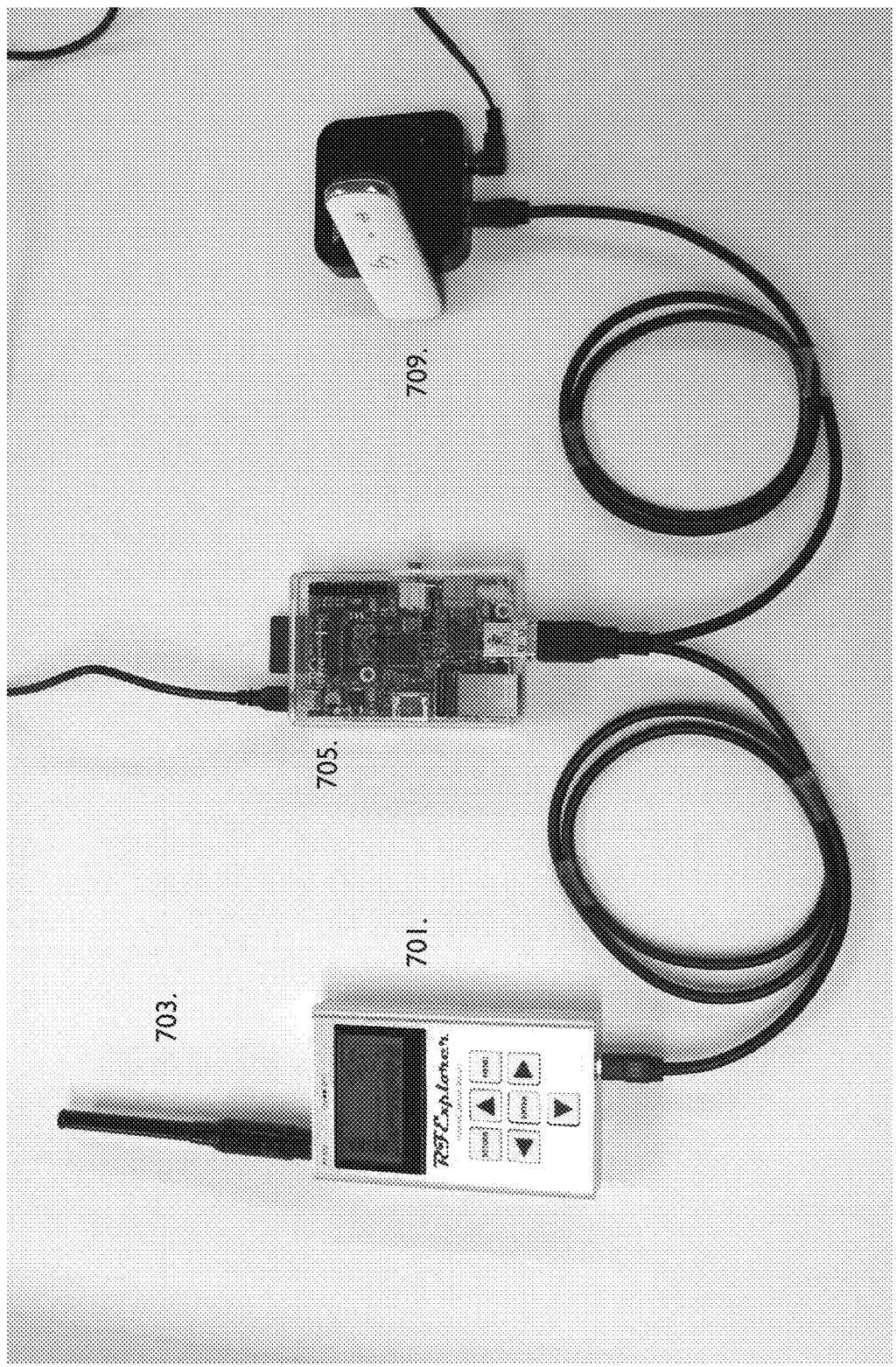
FIG. 7 is an exemplary functioning prototype hardware configuration featuring a handheld portable radio frequency spectrum analyzer with an operating range of 240-960 MHz with USB connection, in accordance with embodiments of the present invention.

Referring to FIG. 7, an exemplary functional prototype is shown to include handheld 240-960 MHz RF sensor 701 with antenna 703, with a serial data connection to embedded linux PC 705. Cellular modem 709 transfers the RF data to the web application (e.g., the web application described further in conjunction with FIG. 15). The configuration shown in FIG. 7 would allow, for example, a user in the field to benefit from compatibility with common low cost spectrum analyzers as well as allow existing equipment on hand to gain this remote RF sensor capability.

Figure 8:
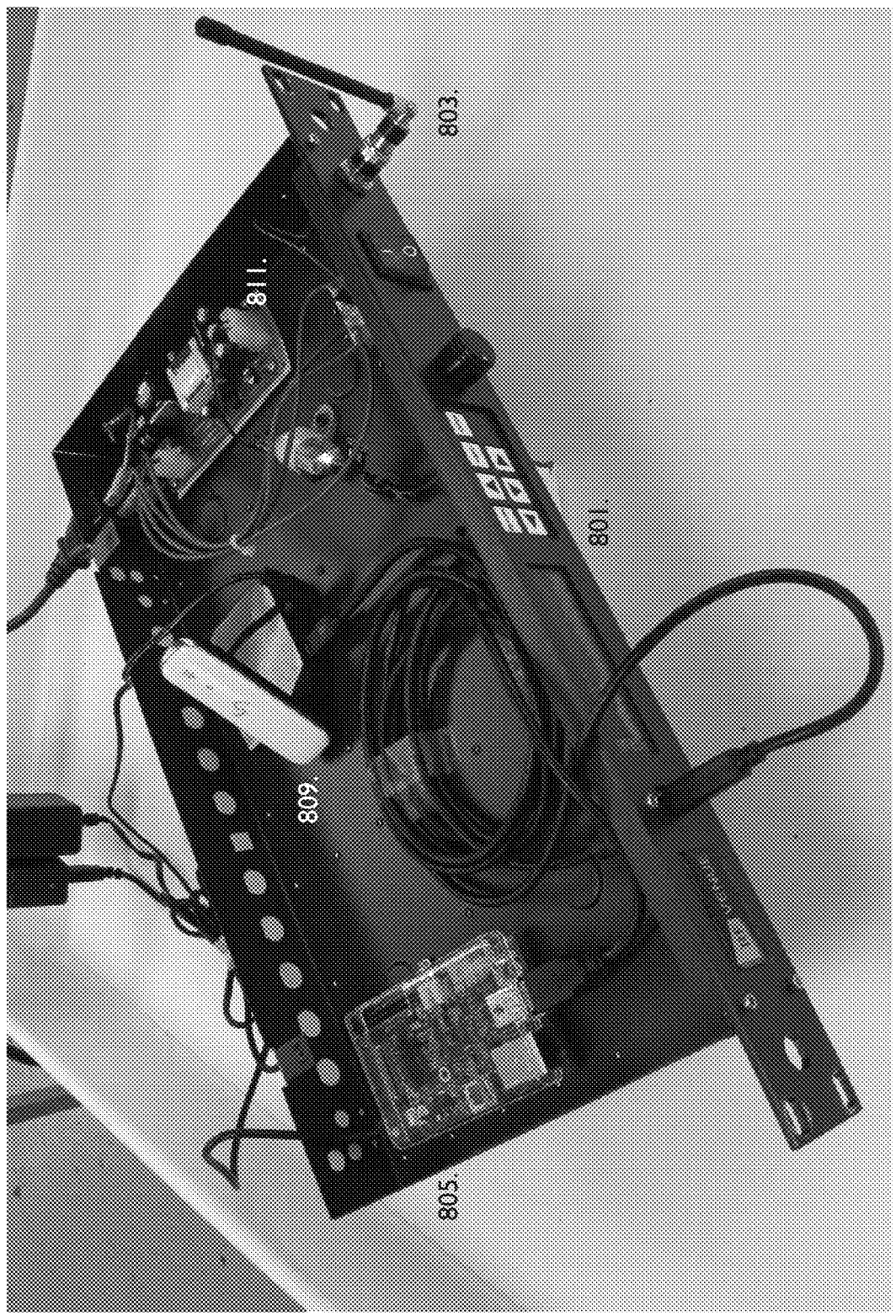
FIG. 8 is an exemplary functioning prototype hardware configuration featuring a 19" rackmounted radio frequency spectrum analyzer with a scanning range of 240-960 MHz with front panel LCD display, rotary control, and USB connection, in accordance with embodiments of the present invention.

Another exemplary functional hardware prototype is shown in FIG. 8, which includes a 19" rackmounted RF sensor 801 and antenna 803, with a serial connection to embedded linux PC 805. Cellular modem 809 transfers the RF data to the web application. Power supply 811 is configured to power each active component. Wireless audio systems are routinely installed in rack-mounted systems for both permanent installation in an integrated system and also in rolling cases for rental and live sound production application. With the configuration shown in FIG. 8, for example, a user is able to embed the system with her wireless audio equipment and remotely monitor and manage it, rather than integrate a separate, non-rack compatible module which may become damaged during shipment or in a harsh live sound and staging environment.

Figure 9:
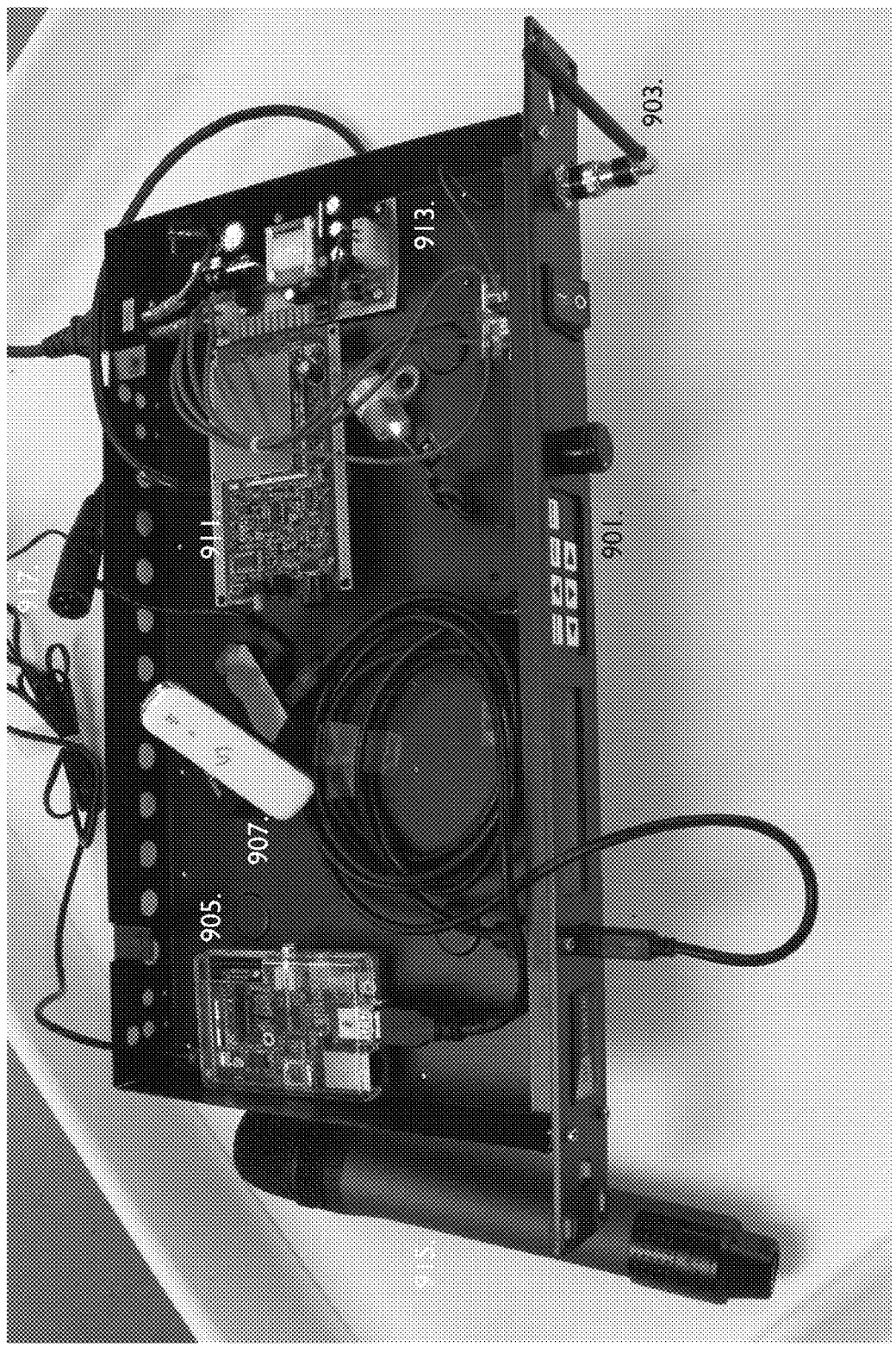
FIG. 9 is an exemplary hardware configuration which includes a 19" rackmounted radio frequency spectrum analyzer with one or more integrated wireless audio receivers, in accordance with embodiments of the present invention.

Another exemplary hardware configuration is shown in FIG. 9, which includes a 19" rackmounted RF sensor 901 and antenna 903, with a serial connection to the embedded linux PC 905. Cellular modem 907 transfers the RF data to the web application. Power supply 913 is configured to power each active component. Integrated wireless audio receiver 911 receives a radio signal from wireless audio transmitter 915 and demodulates the radio signal to audio output 917. In this configuration shown in FIG. 9, for example, the configuration can be directly integrated with a wireless microphone system for remote monitoring and management. This configuration can eliminate rack space and gives the user a direct view into the RF conditions as received by the wireless microphone system.

Figure 10:
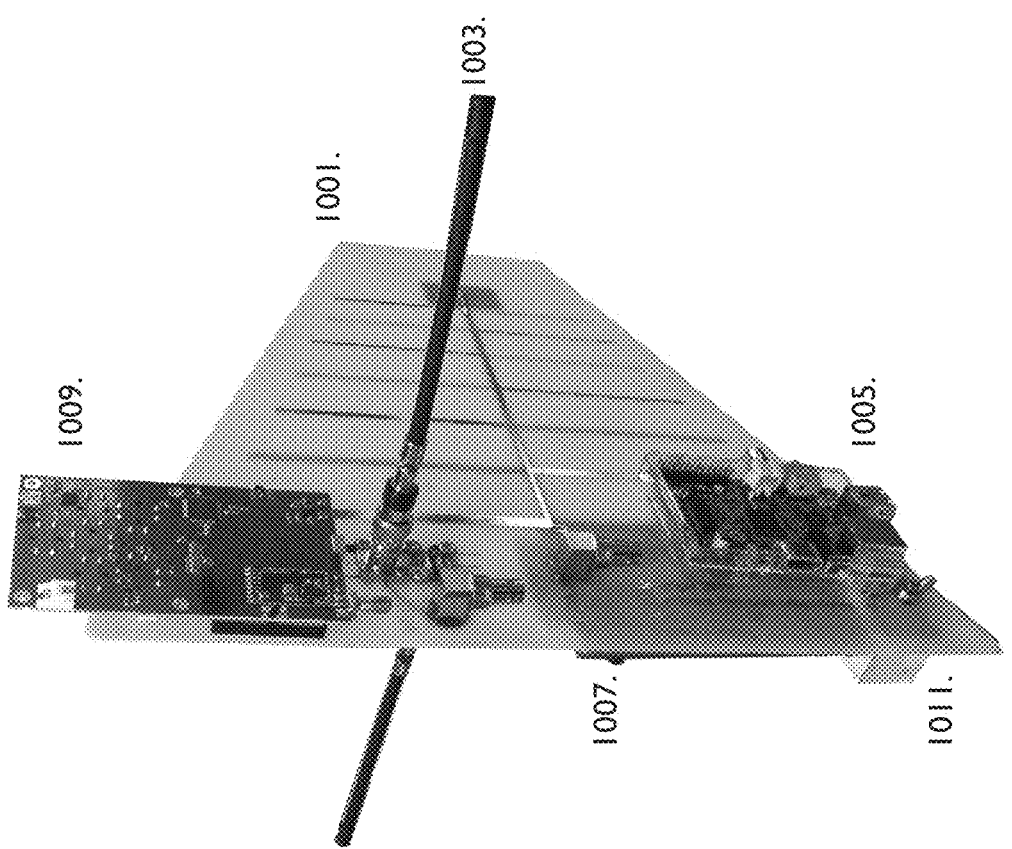
FIG. 10 is an exemplary hardware configuration which includes a radio frequency spectrum analysis circuit integrated with a polarization diversity antenna array with one or more wireless audio receiver circuits, in accordance with embodiments of the present invention.

Referring now to FIG. 10, an RF spectrum analysis sensor 1009 is shown integrated with a polarization diversity antenna array with embedded linux PC 1005. Polarization diversity antenna array can include log periodic dipole array 1001 and dipole 1003 antennas. Wireless audio receiver 1007 demodulates a radio signal to audio output 1011. By embedding the RF sensor and wireless audio receiver directly onto a popular antenna configuration for wireless microphones as shown in FIG. 10, a user can, for example, permanently install this system on a wall without any rack-mounted equipment. Alternatively in a temporary deployment, for example, a user may simply connect to their audio mixer or amplifier without the need for a rack to house the wireless audio receivers, reducing equipment cost and setup time.

Figure 11:
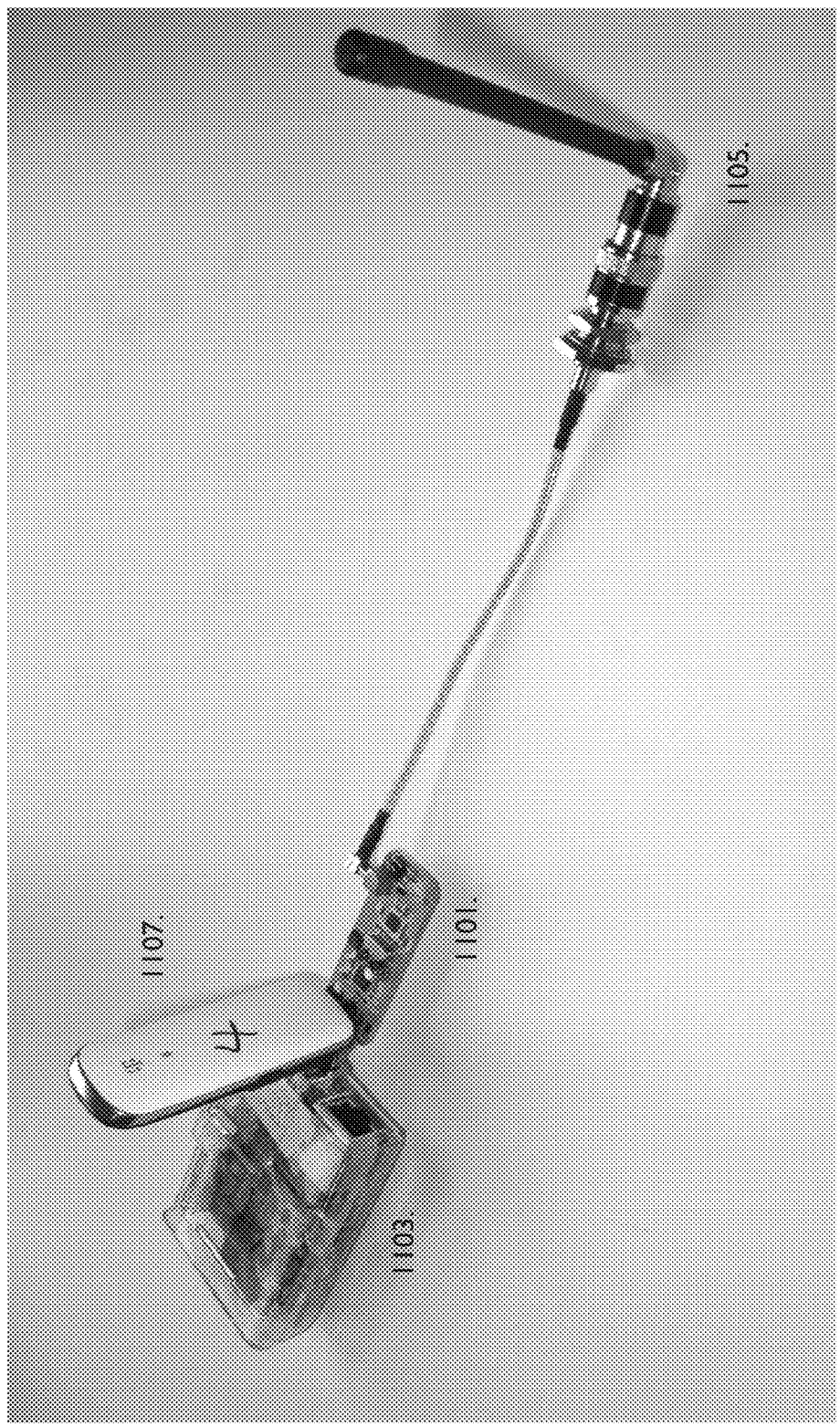
FIG. 11 is an exemplary hardware configuration that includes a wideband software defined radio using an RTL2832U chip with USB or ethernet connectivity with 24 to 1766 MHz operating range, in accordance with embodiments of the present invention.

Another exemplary configuration is shown in FIG. 11, which includes a wideband software defined radio 1101 such as an RTL2832U chip with USB or ethernet connectivity with 24 to 1766 MHz operating range. Software defined radio 1101 receives RF energy from antenna 1105 and transmits frequency and RF signal amplitude data to embedded linux PC 1103 with further transmission to cellular modem 1107. Cellular modem 1107 transmits data to the web application. The configuration shown in FIG. 11 can enable, for example, a hobbyist user or one untrained in RF engineering to access a remote RF monitoring and management platform at a low hardware cost.

Figure 12:
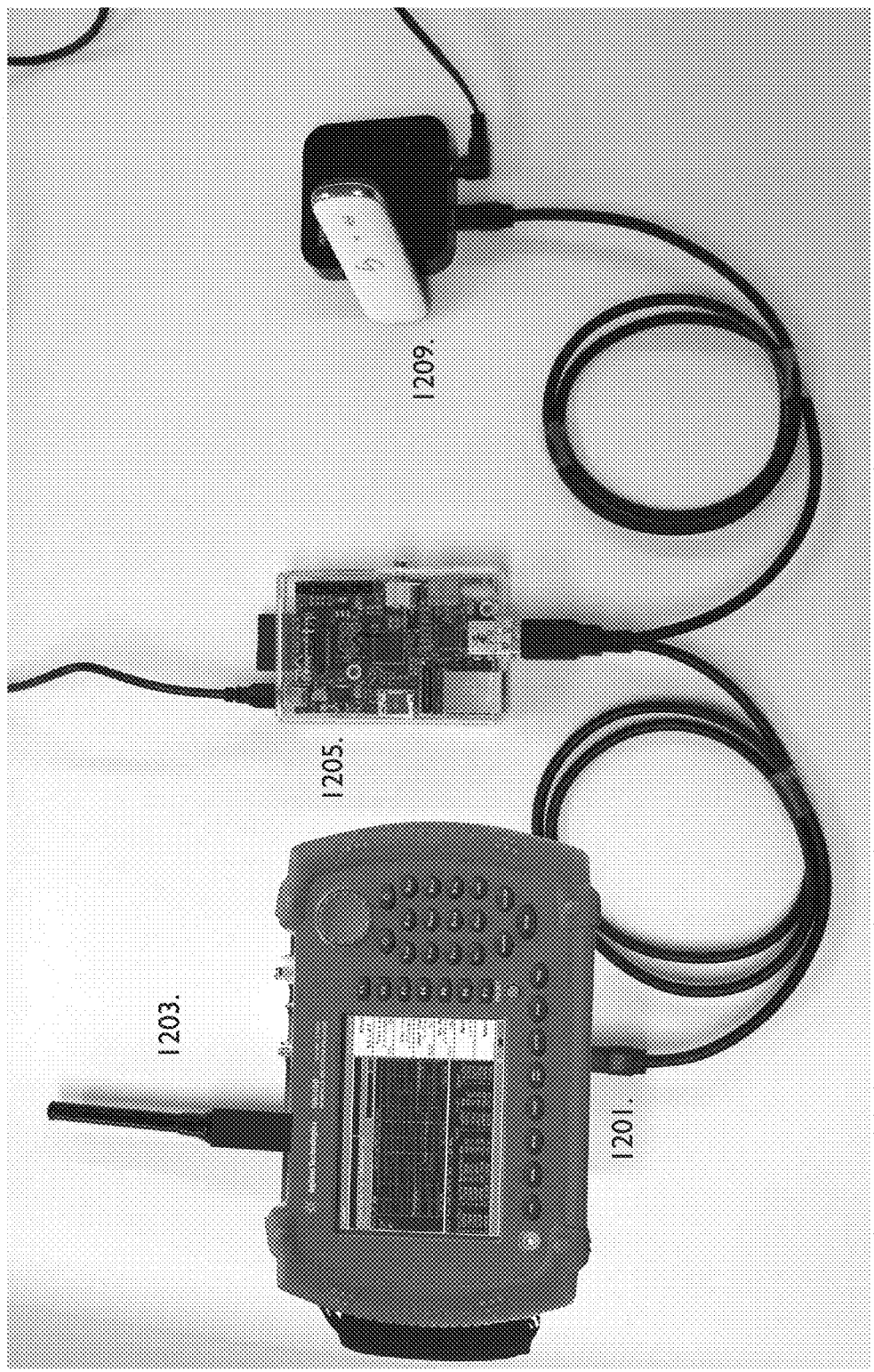
FIG. 12 is an exemplary configuration that includes a wideband high resolution spectrum analyzer operating from 0-6 GHz with USB or ethernet connectors, in accordance with embodiments of the present invention.

In another exemplary configuration shown in FIG. 12, a wideband high resolution spectrum analysis system such as an Agilent 9640b with an operating range of 0-6 GHz is connected via USB or ethernet connection to embedded linux PC 1205. Embedded linux PC 1205 transmits RF frequency and RF signal amplitude data to cellular modem 1209. Cellular modem 1209 transmits data to the web application. The configuration shown in FIG. 12 enables, for example, a highly experienced user working with the most sensitive spectrum analysis equipment to access a remote RF monitoring and management capability.

Figure 13:
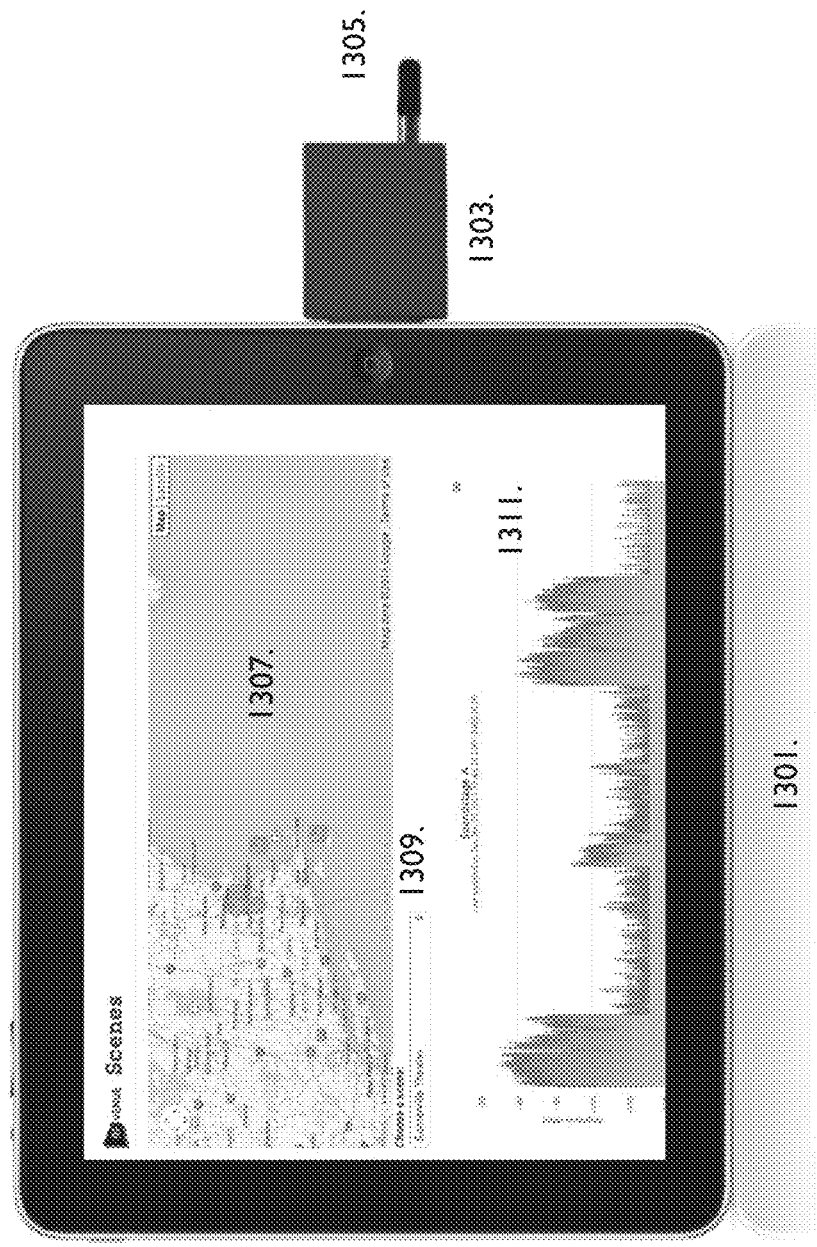
FIG. 13 is an exemplary configuration that includes a computer tablet-compatible dongle radio frequency spectrum analyzer with a 240-960 MHz operating range with micro-USB, 16-pin or Thunderbolt compatible connectors, in accordance with embodiments of the present invention.

Another exemplary configuration is shown in FIG. 13 to include a computer tablet-compatible dongle radio frequency spectrum analyzer 1303 with a 240-960 MHz operating range with micro-USB, 16-pin or Thunderbolt compatible connectors. Spectrum analyzer circuit 1303 receives RF energy from antenna 1305 and transmits data to hosted software application device 1301. Hosted software application includes geographic map overlay 1307 of spectrum analyzer location. RF scan information is shown in graph 1311 with signal level and frequency plotted. User selectable menu 1309 can include multiple sources of user RF data. Users mapping the RF coverage areas in a facility may "walk test" coverage using portable spectrum analysis equipment or table computers. The configuration shown in FIG. 13 enables, for example, a field technician to access the RF scan data from a table computer and also directly connect the RF sensor module for mobile data gathering.

Figure 14:
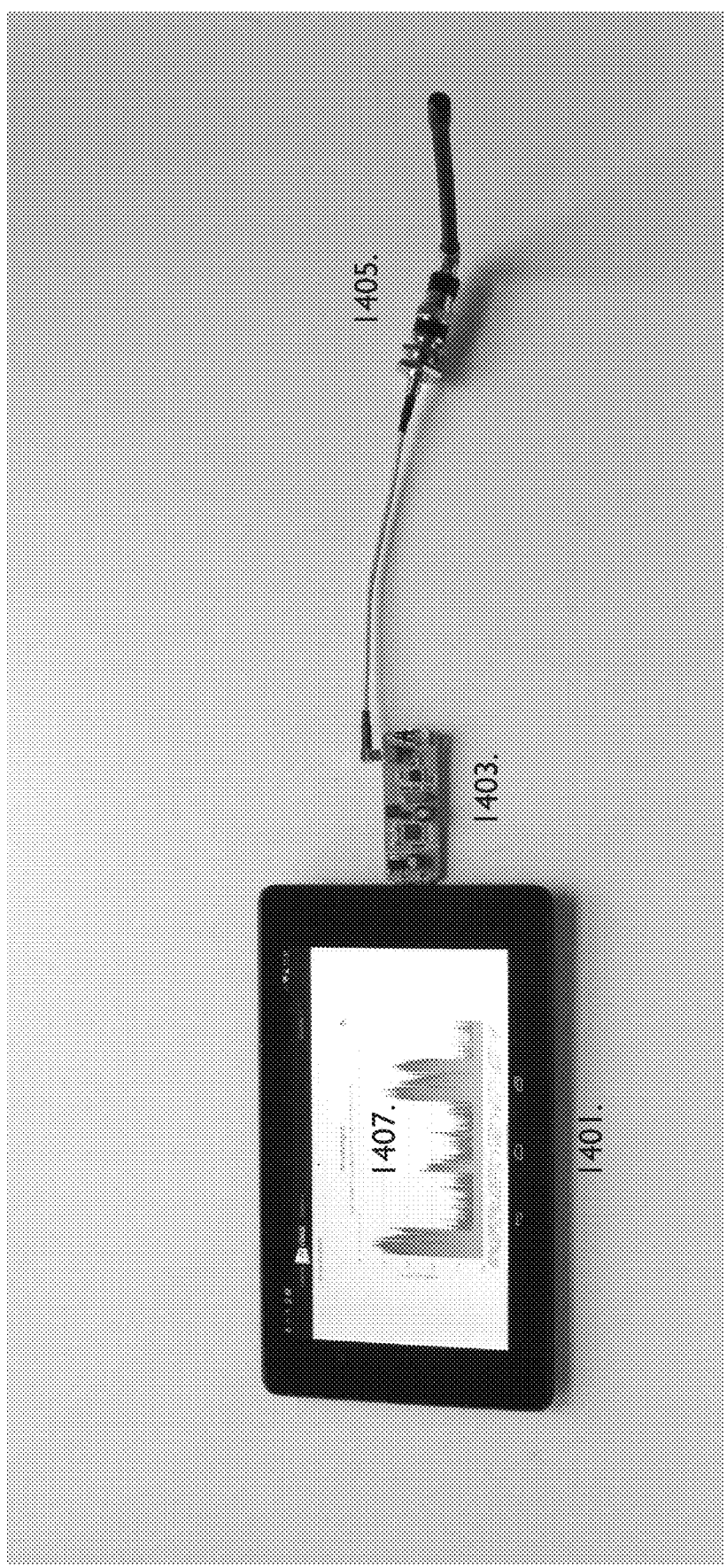
FIG. 14 is an exemplary configuration that includes a computer tablet-compatible software defined radio with a 24-1766 MHz operating range with micro-USB, 16-pin or Thunderbolt compatible connectors, in accordance with embodiments of the present invention.

In another exemplary configuration shown in FIG. 14 a wideband software defined radio 1403 receives RF data from remote antenna 1405 and transmits frequency and RF signal amplitude data via serial connection to computing device 1401. Hosted software application 1407 displays RF data. The configuration shown in FIG. 14 enables, for example, a hobbyist user or one untrained in RF engineering to access a remote RF monitoring and management platform at a low hardware cost and connect to a table computer for displaying RF scan data.

Figure 15:
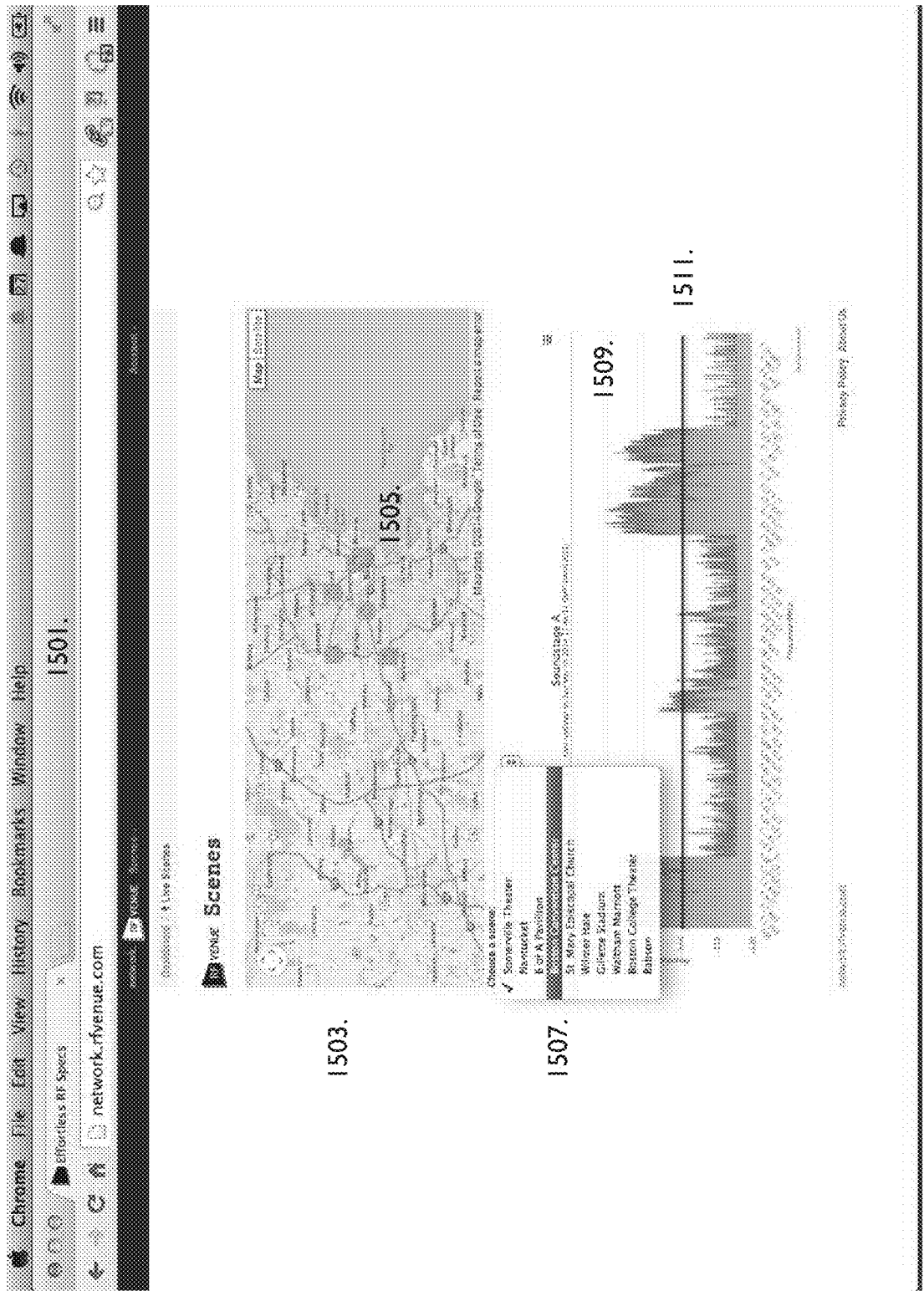
FIG. 15 is an exemplary working prototype web application that includes geographic display, RF scan data, and user-selectable remote sensor nodes with intermodulation calculation threshold, in accordance with embodiments of the present invention.

An exemplary working web application prototype is shown in FIG. 15, with 1505 RF sensor map, user selectable RF sensor location listing 1507, RF signal level and frequency plot 1509 with intermodulation distortion calculator signal level 1511. The RF sensor locations selectable from the RF sensor location listing 1507 are shown in the RF sensor map 1505.

Figure 16:
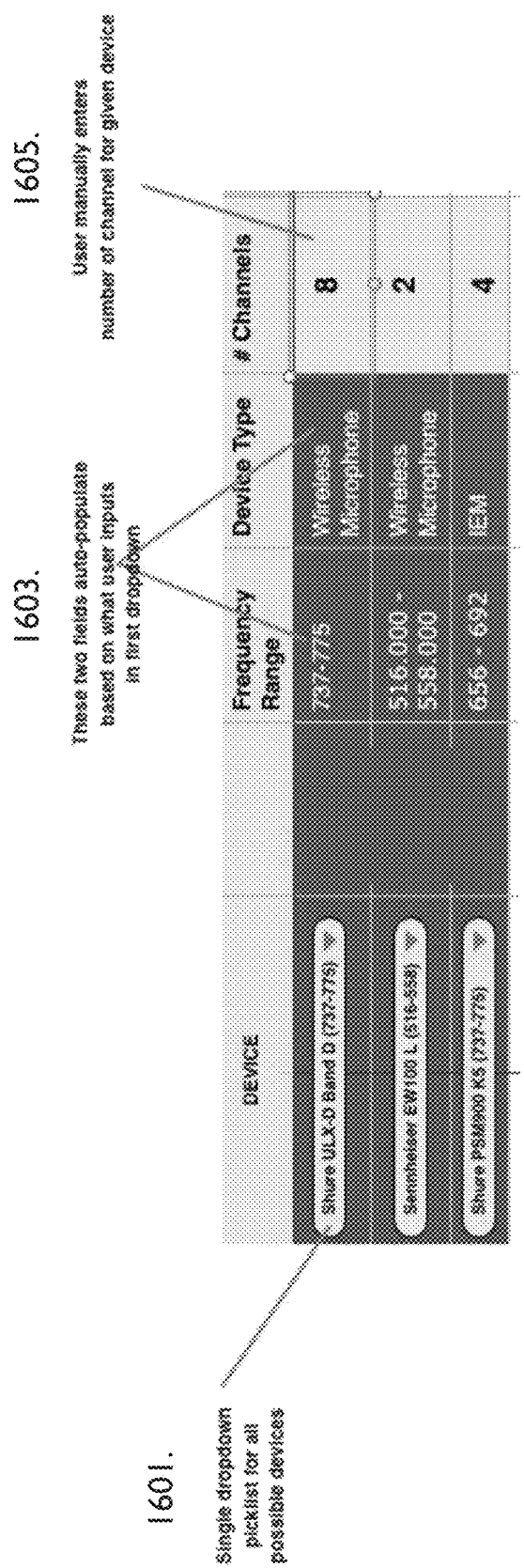
FIG. 16 is an exemplary user-configurable equipment profile table for a web application interface, in accordance with embodiments of the present invention.

Referring now to FIG. 16, an exemplary user configurable equipment profile is displayed. A user selects from a common list of wireless systems in 1601, which displays device frequency ranges 1603 from the database (e.g., the "frequency range" and "device type" can be automatically populated based on the selected device). The user inputs the number of each of the devices desired for a live event or installed audio system in the "# Channels" column 1605.

FIG. 17 displays an example wireless audio system equipment database comprised of equipment listed by type of device 1701 (e.g., wireless microphone), device manufacturer 1703 (e.g., Audio Technica, Sennheiser, and Shure), device model 1705, frequency band 1707 and frequency range 1709. The wireless audio system equipment database can be used to provide selection options for the user configurable equipment profile shown in FIG. 16.

Referring now to FIG. 18, an example view of a web application including user configurable equipment profile 1801 (e.g., described above in FIG. 16) with notation function 1803 and other functions is shown. A user selects the equipment type (e.g., in the "Device" column) and enters the number of devices (e.g., in the "# Channels" column) to be used from 1801 database controller, and sets an optimal signal level threshold 1807 to compute a list of frequencies 1809 via an intermodulation distortion algorithm. The intermodulation distortion calculation outputs a list of frequencies 1809 that are unoccupied and free of intermodulation distortion for use in setting transmitter frequencies for wireless audio equipment. This frequency list and accompanying RF scan data can be exported via export function 1805 for use offline or for integration with third party software applications.

Figure 19:
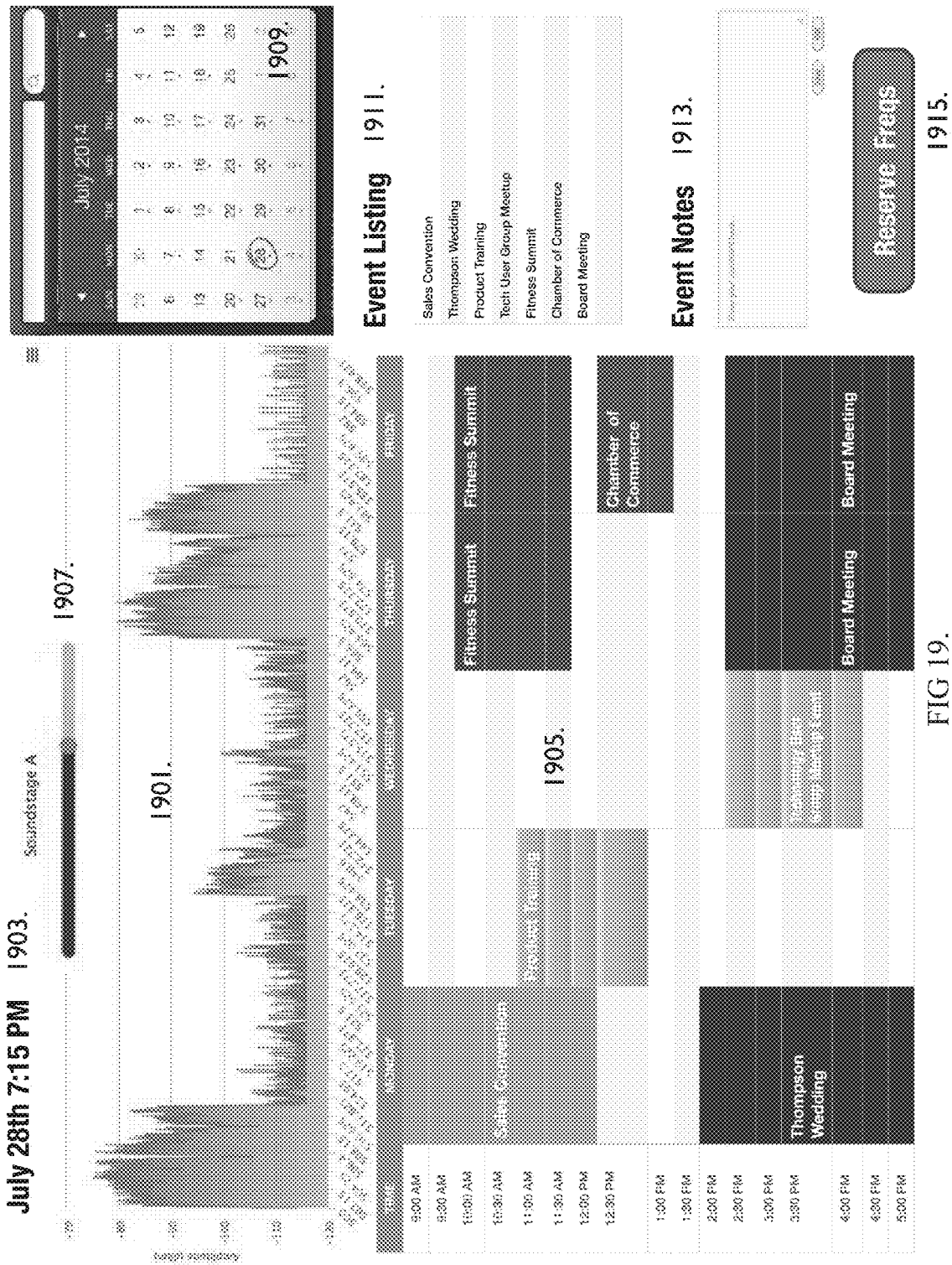
FIG. 19. is an example view of a web application with calendar function viewing historical RF data and reserving wireless frequencies for scheduled events, in accordance with embodiments of the present invention.

Another example view of the web application is shown in FIG. 19, where past and future wireless events may be entered and planned by a user. Real time or historical RF data is displayed in spectrum graph 1901. A slider function 1907 can be used to toggle back through the date and time listing 1903 to examine previous RF activity. Calendar 1905 can be edited by a user and/or managed by an authorized administrator to coordinate events and facilitate frequency coordination among events listed at 1911 and searchable on calendar view 1909. Notes may be listed at 1913 and frequencies compiled in the web application may be reserved at 1915. Multi-room environments such as houses of worship, convention centers, and hotels often have multiple events ongoing in separated areas but must still contend with RF interference or spillover of stray RF energy from one event to another. A robust calendar and coordination interface visible by all wireless stakeholders increases wireless audio system reliability and increases available RF spectrum throughout the facility by more efficiently allocating frequencies by event.

Figure 20:
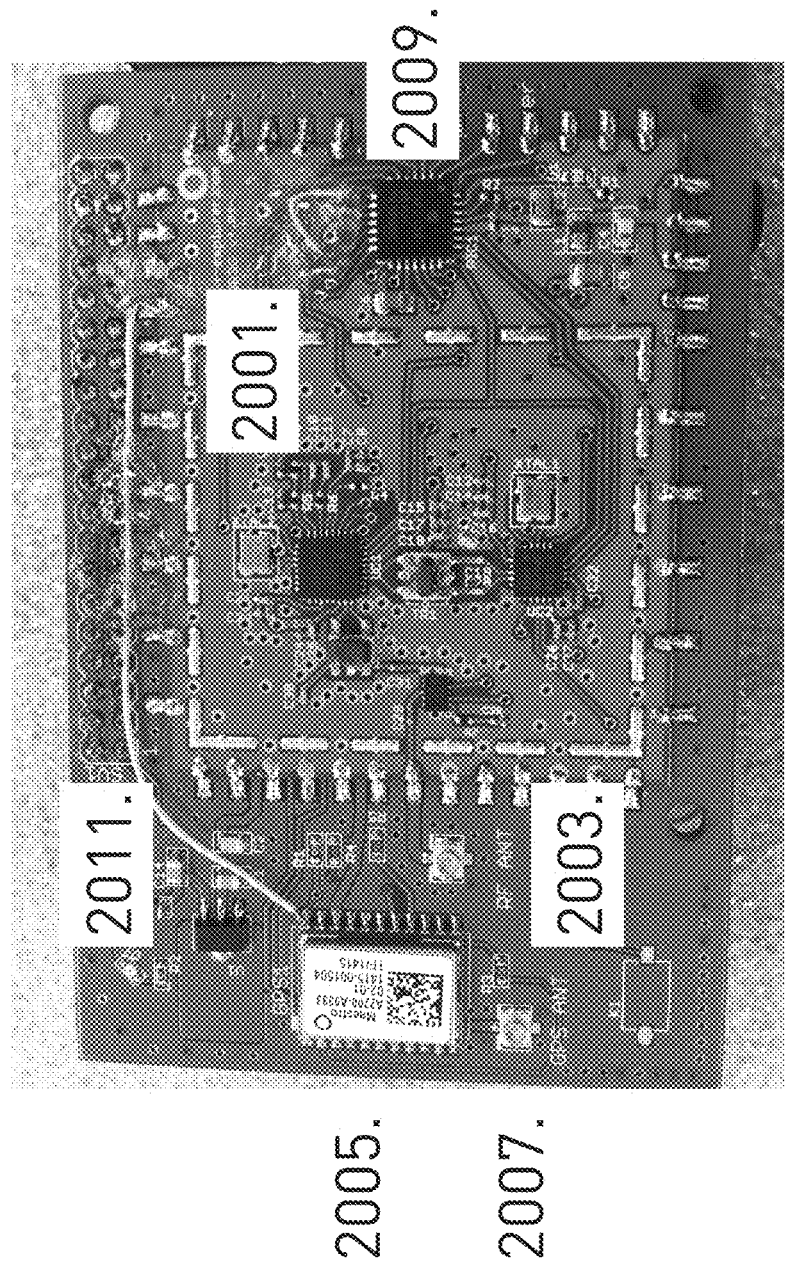
FIG. 20 is an exemplary functional printed circuit board prototype of a self-contained RF sensor 2001 with 15-2700 MHz operation range, in accordance with embodiments of the present invention.

Referring now to FIG. 20, an exemplary functional printed circuit board prototype of a self-contained RF sensor 2001 with 15-2700 MHz operation range is shown. Embedded CPU 2009 processes RF sensor data from RF input connection 2003 and provides location data from and embedded GPS module 2005 with GPS antenna input 2007. With these combined capabilities, the exemplary circuit becomes, for example, a complete module which can interface with a wide range of single board and/or embedded computer modules. The circuit can also, for example, be integrated in third party products for OEM remote RF monitoring and management applications.

Figure 21:
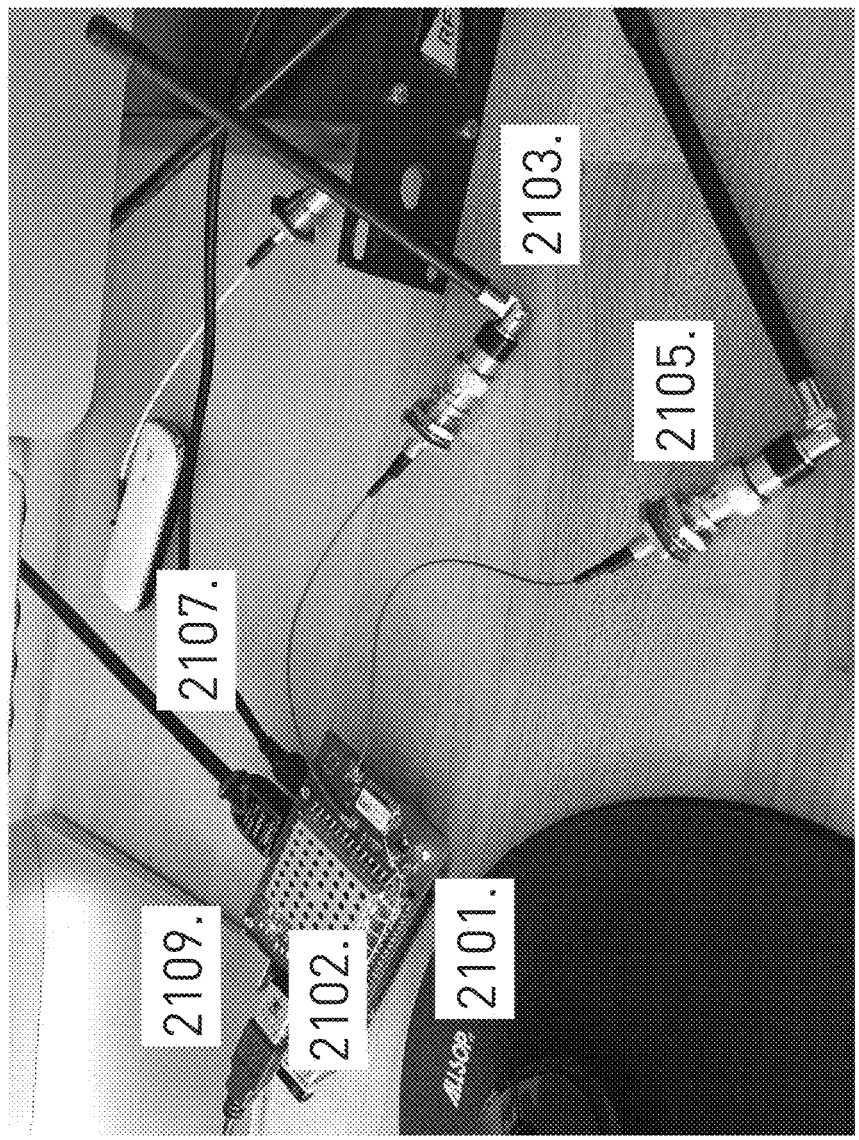
FIG. 21 is an exemplary functional printed circuit board connected via general purpose In/Out pin connection to single board PC, in accordance with embodiments of the present invention.

In FIG. 21 an exemplary functional printed circuit board prototype is connected via general purpose In/Out pin connection to single board PC 2101. LAN connection 2109 provides data transmission capability as does cellular modem 2107. Wideband dipole antenna 2103 captures RF data and provides it to the embedded RF sensor module 2102. GPS antenna 2105 improves GPS signal quality indoors and provides GPS RF signals to embedded RF sensor module 2102. Once the exemplary functional printed circuit board receives power and LAN connection, it can be configured to automatically scan and transmit data to a web server (e.g., the web server in FIG. 1) for processing and display in web application in FIG. 1. This can, for example, remove the need for any onsite configuration or RF engineering expertise, allowing anyone with network access to setup and deploy the exemplary prototype configurations described herein.

Figure 22:
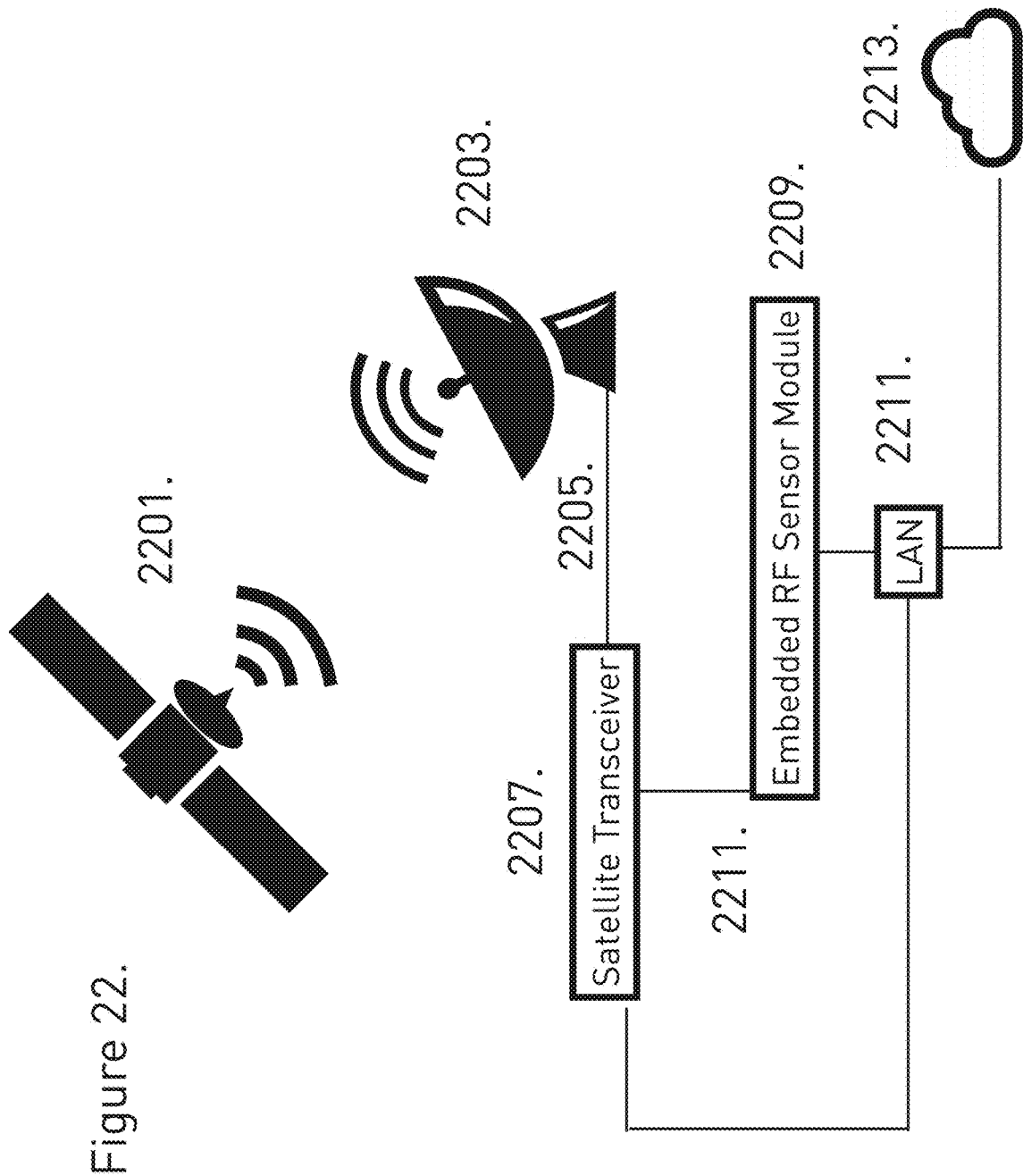
FIG. 22 is an exemplary configuration for remote monitoring and management of very small aperture (VSAT) satellite signals, in accordance with embodiments of the present invention.

Referring now to FIG. 22, a Very-Small Aperture Terminal (VSAT) satellite communications system is shown. Orbiting satellite 2201 transmits and receives RF signals from geo-located satellite antenna 2203. Geo-located satellite antenna 2203 may be in a fixed location or on maritime vessels in transit. RF connection 2205 transfers signals to Satellite Transceiver 2207. Embedded RF Sensor module 2209 captures RF signals from Satellite Transceiver 2207 output, and connects to LAN 2211. LAN 2211 connects to web-based application 2213 where VSAT RF spectrum data can be monitored and managed remotely. Similar to the dynamic nature of RF conditions for wireless audio systems, VSAT communications used, e.g., on marine vessels and on marine energy installations, can be subject to third party interference and signal dropouts. When embedded RF sensor module 2209 is connected to VSAT communications equipment, the RF conditions can be remotely viewed, and new transmit and/or receive channels can be determined as described herein to reconfigure communication equipment for better reliability.

Figure 23:
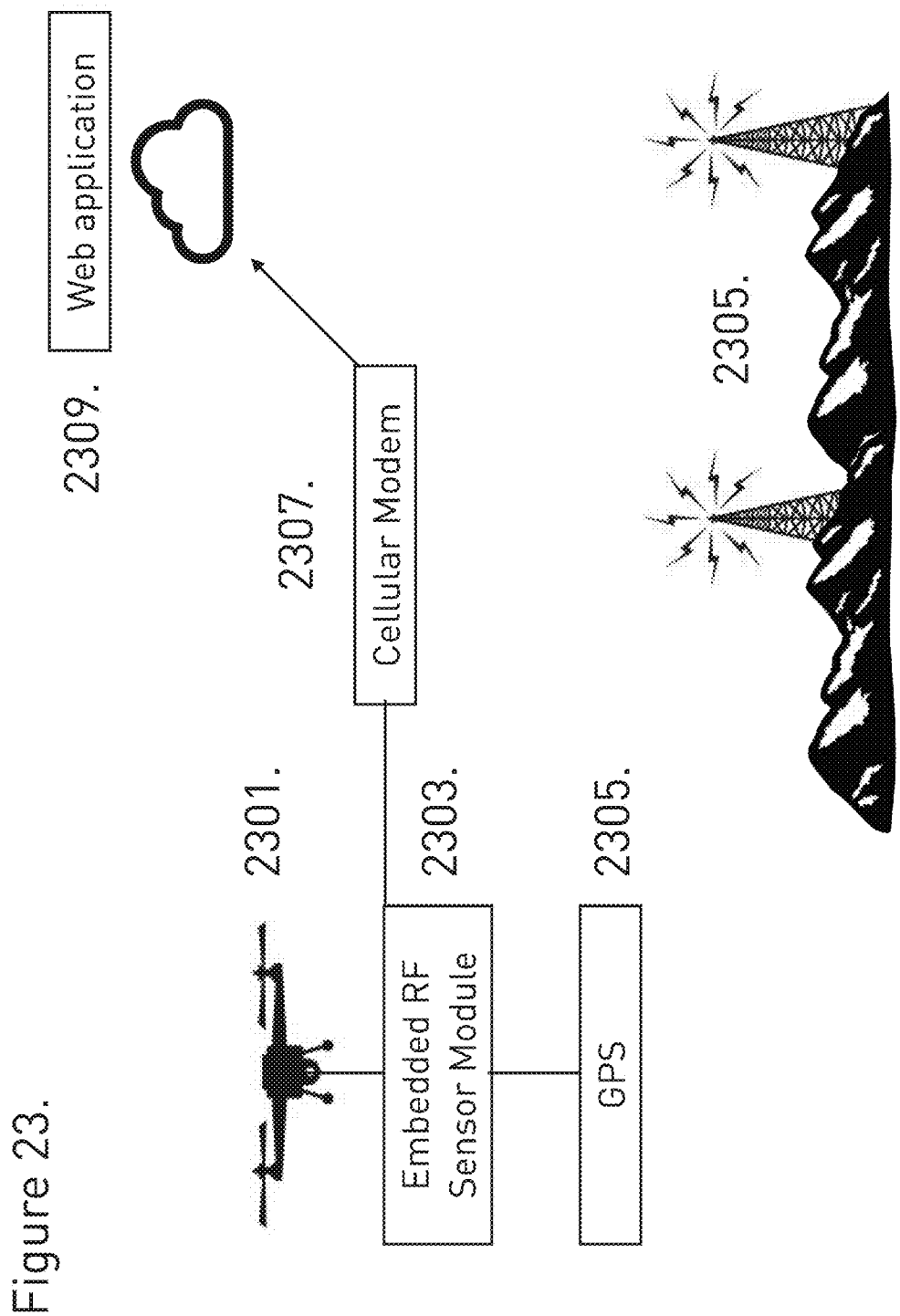
FIG. 23 is an exemplary configuration for gathering RF spectrum data via an unmanned aerial vehicle (UAV), in accordance with embodiments of the present invention.

Referring now to FIG. 23, an unmanned aerial vehicle with RF data mapping capability is shown. Unmanned aerial vehicle (UAV) 2301 has embedded RF sensor module 2303 attached. Embedded RF sensor module includes GPS sensor 2303 to capture location data alongside RF spectrum data from transmission sources 2307. GPS and RF data captured by Embedded RF sensor module 2303 can include local data storage to capture flight data, RF and location data for later retrieval and analysis. Embedded RF sensor module 2303 may alternatively transmit flight data, RF data, and location data to web application 2309 (e.g., described above) via Cellular Modem 2307 for remote analysis.

Figure 24:
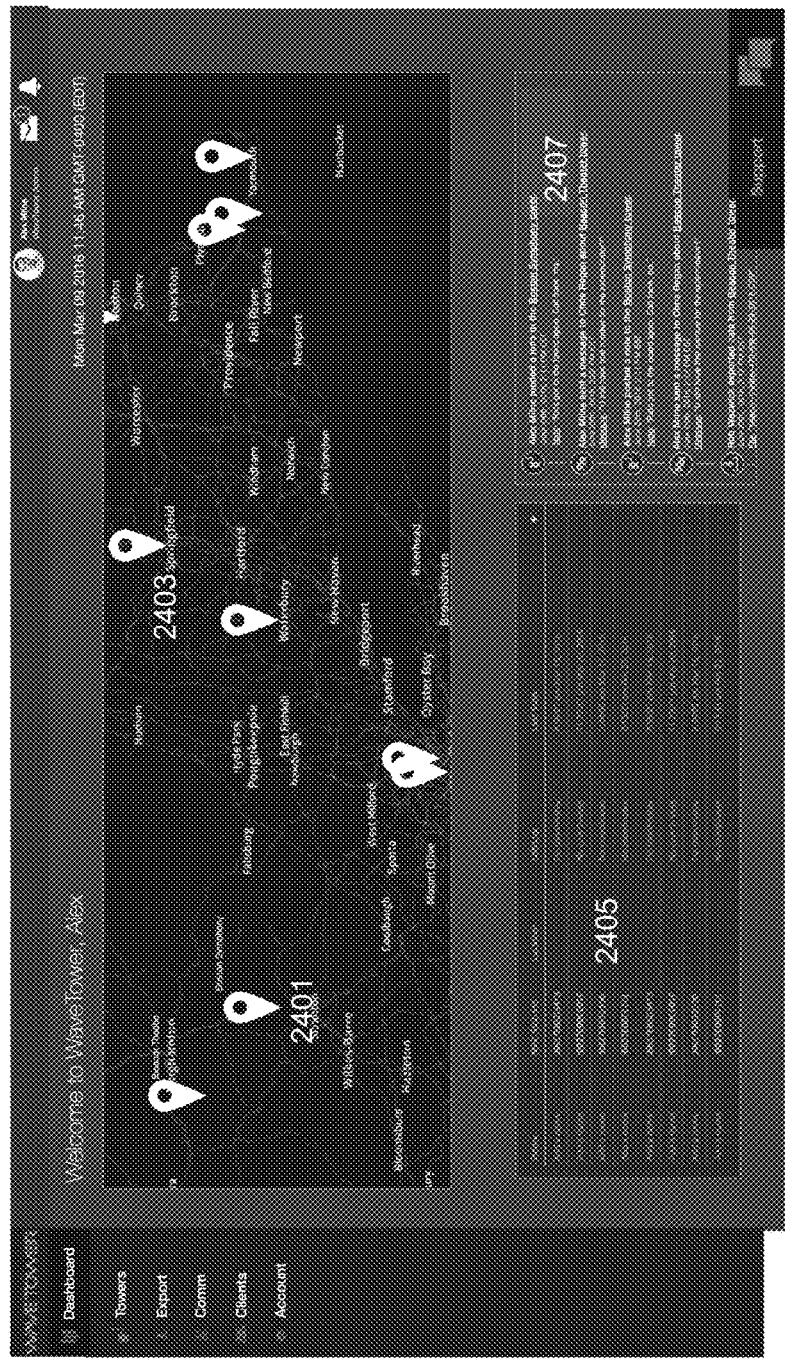
FIG. 24 is an exemplary graphical user interface showing RF sensor locations on a map, with RF sensor location data and device status details displayed in a table, in accordance with embodiments of the present invention.

Referring now to FIG. 24, RF sensor location 2401 and RF sensor location 2403 are each gathering RF spectrum data at different respective geographic locations over time, as shown by the plotting of RF sensor location 2401 and 2403 on the geographic map. A user can select multiple RF sensor locations from RF sensor table 2405 to perform multiple-site spectrum analysis. RF sensor table 2405 shows the name of the RF sensor (e.g., if assigned), the MAC address of the RF sensor, the location of the RF sensor, the latitude and longitude of the RF sensor (e.g., if the coordinates are known), and the time of the last scan by the RF sensor. With many hundreds or thousands of RF sensors on this display, a user can stitch together individual sensor location scan data to form macro-geographic scans of current and historical RF spectrum activity. This can enable, for example, spectrum stakeholders to more efficiently provision wireless equipment across wide areas and coordinate spectrum use by day and time. This technique can enable wireless spectrum license holders to monitor use of their frequencies and enforce protections against unauthorized transmissions. Otherwise, enforcing licensed frequencies is at best guesswork, given the dynamic nature of the RF environment, where an authorized transmitter may be in operation at one time but not another. Physically locating an unauthorized transmitter can be very time consuming and therefore generally only attempted for the highest priority licenses such as broadcast radio and television. By allowing real-time and dynamic multiple site monitoring and management of the RF spectrum at those sites, the techniques described herein allow license holders and those untrained in RF interference mitigation to ensure that their frequencies are protected and free from unauthorized interference. Without the present techniques such protection cannot be otherwise achieved with standard spectrum analysis methods. Multiple stakeholders can collaborate with written messages, share documents, and monitor updates to each RF sensor location in the timeline window 2407.

One exemplary example of a regional mapping is a provider of audio visual services to hotels. Such a provider could offer in-house audio visual production services with a staff of engineers with offices in each hotel across a city or wider regional area. From a remote location, the techniques provide for overlaying RF spectrum scans and performing frequency set calculations to identify a set of frequencies that may be free from interference and intermodulation distortion at every location. This can greatly simplify equipment coordination and deployment, by providing a list of qualified candidate frequencies to each hotel office. By overlaying the RF spectrum and examining changes over time, new interference sources can be identified, a library of qualified frequencies can be continually updated, and those changes or recommendations can be easily communicated to each hotel property.

Another example of a potentially wider area mapping is a professional sports league, which manages very high traffic RF environments at each game across an entire country. With each stadium covered by one or more RF sensors, the techniques efficiently identify sources of interference that may interrupt or disrupt wireless audio systems for television or radio broadcast across all stadiums. For a licensed spectrum user like a sports league, such a unified map of RF spectrum activity over time can provide an invaluable record for enforcement of key licensed frequencies for regulatory bodies such as the FCC.

Referring now to FIGS. 25A-D, FIG. 25A shows an exemplary graphical user interface to display RF scan data from one or more remote RF sensors. A user can narrow or widen the span (e.g., upper and lower frequency limit range) of frequencies displayed in the user interface with control bar 2501. RF scan data can be continuously gathered by the RF sensor and sent to the web application. In some embodiments, a user can scroll backwards through historical scans and play back scan information using the rewind, stop, play, fast forward controller 2503. With these and/or other such controls, a user can go backwards to a previous date and time to review scan data and perform spectrum analysis to reduce the probability of a signal dropout or interference event at future date and time. The controller 2503 therefore allows RF frequency data to be analyzed over time, e.g., by rewinding and fast forwarding to look at changes as they occur in time.

Figure 25A:
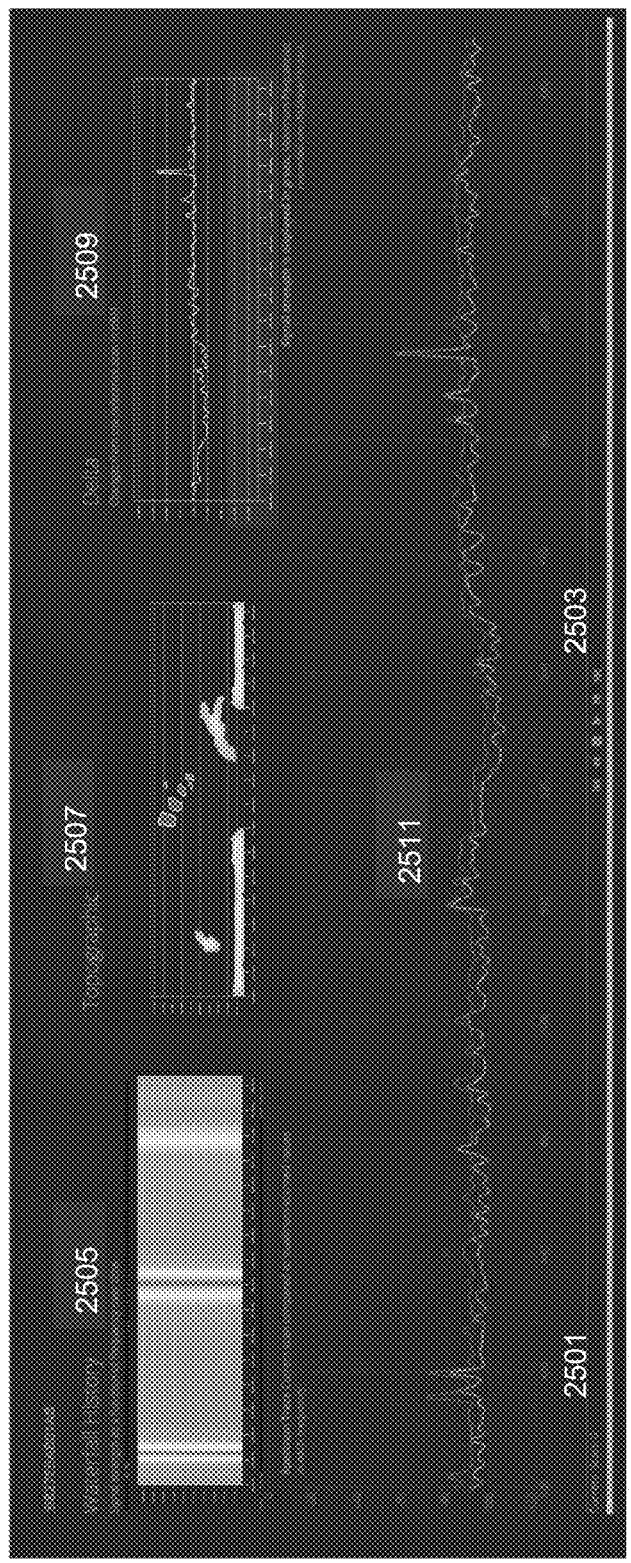
FIG. 25A-D show an exemplary graphical user interface to display RF scan data from one or more remote RF sensors, in accordance with embodiments of the present invention.
Figure 25B:
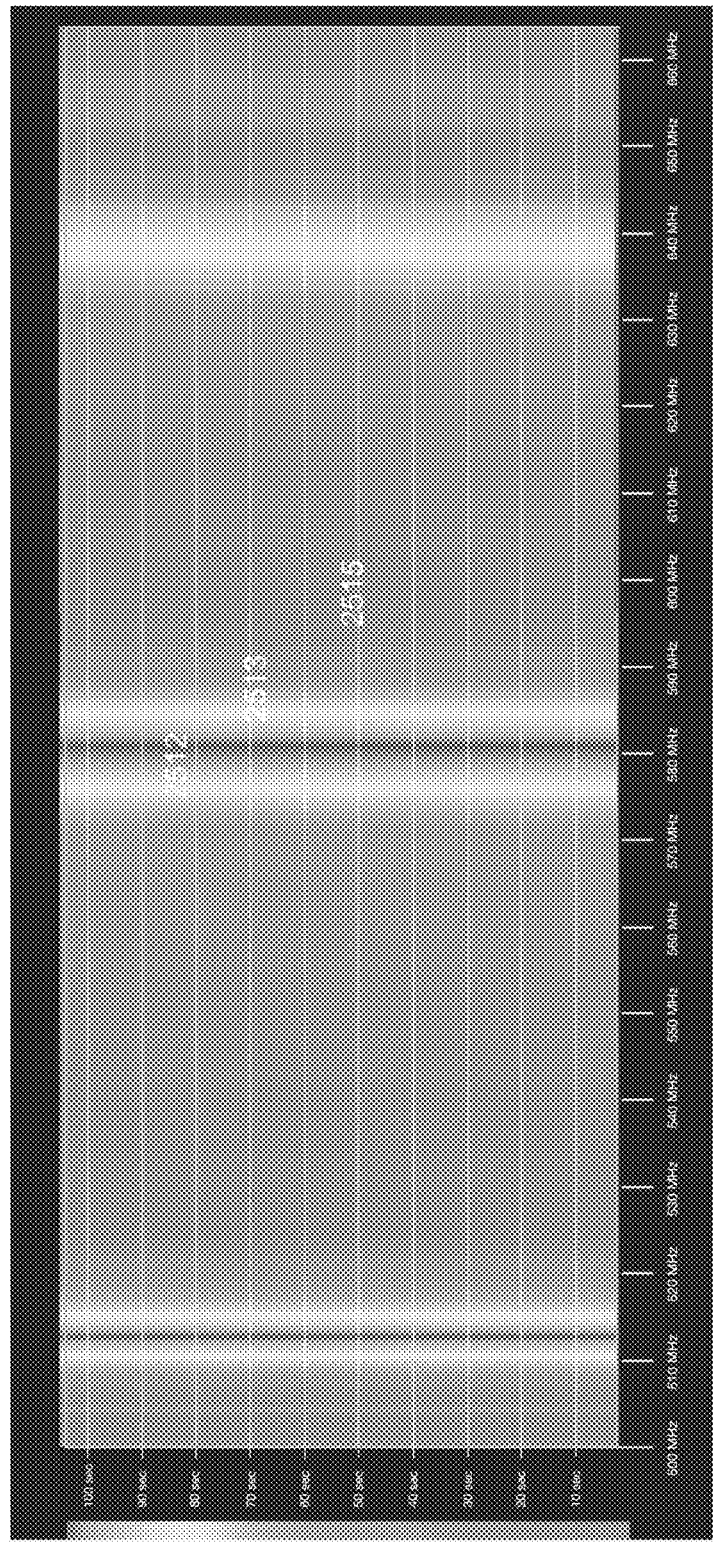
Figure 25C:
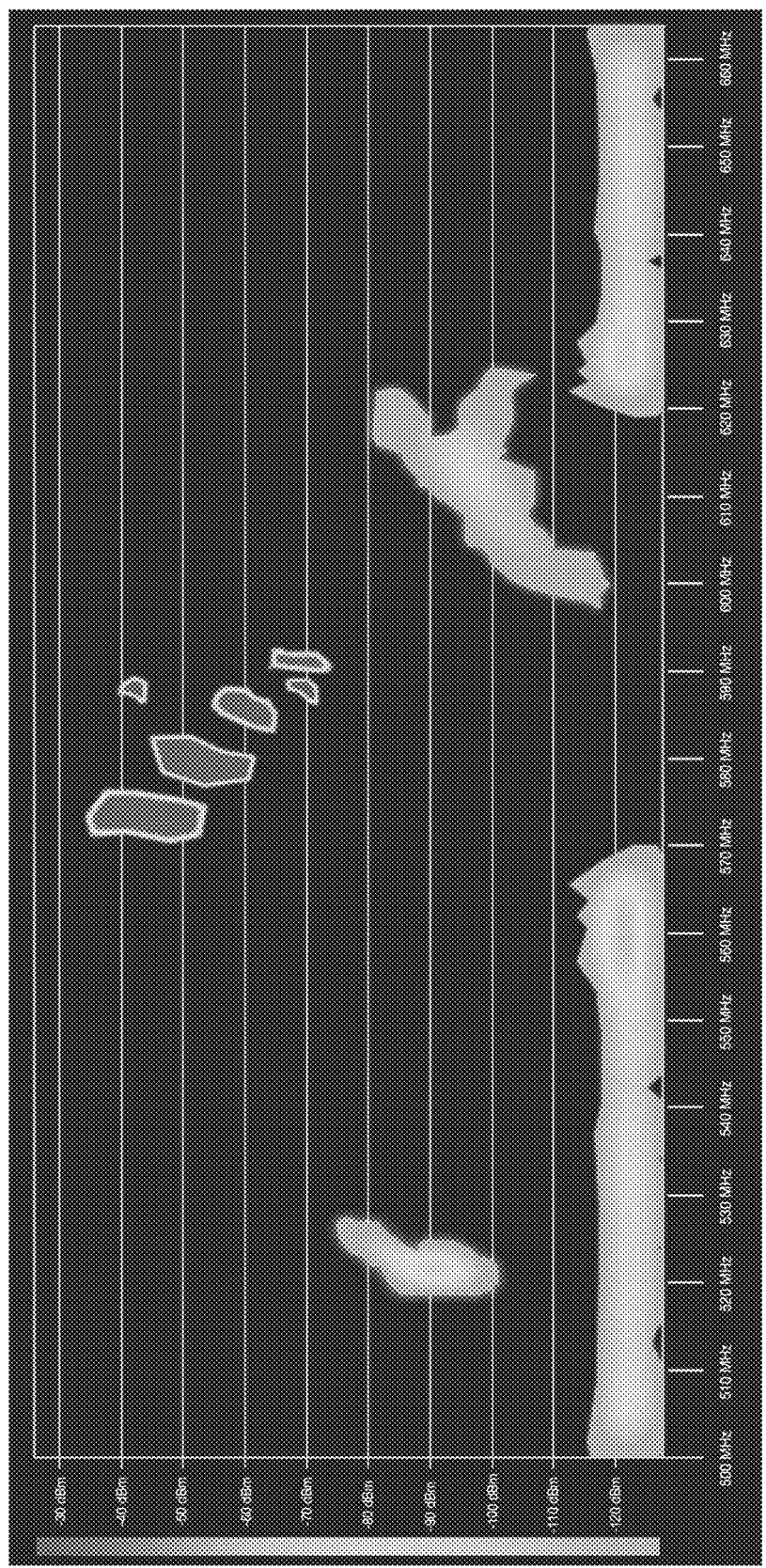
Figure 25D:
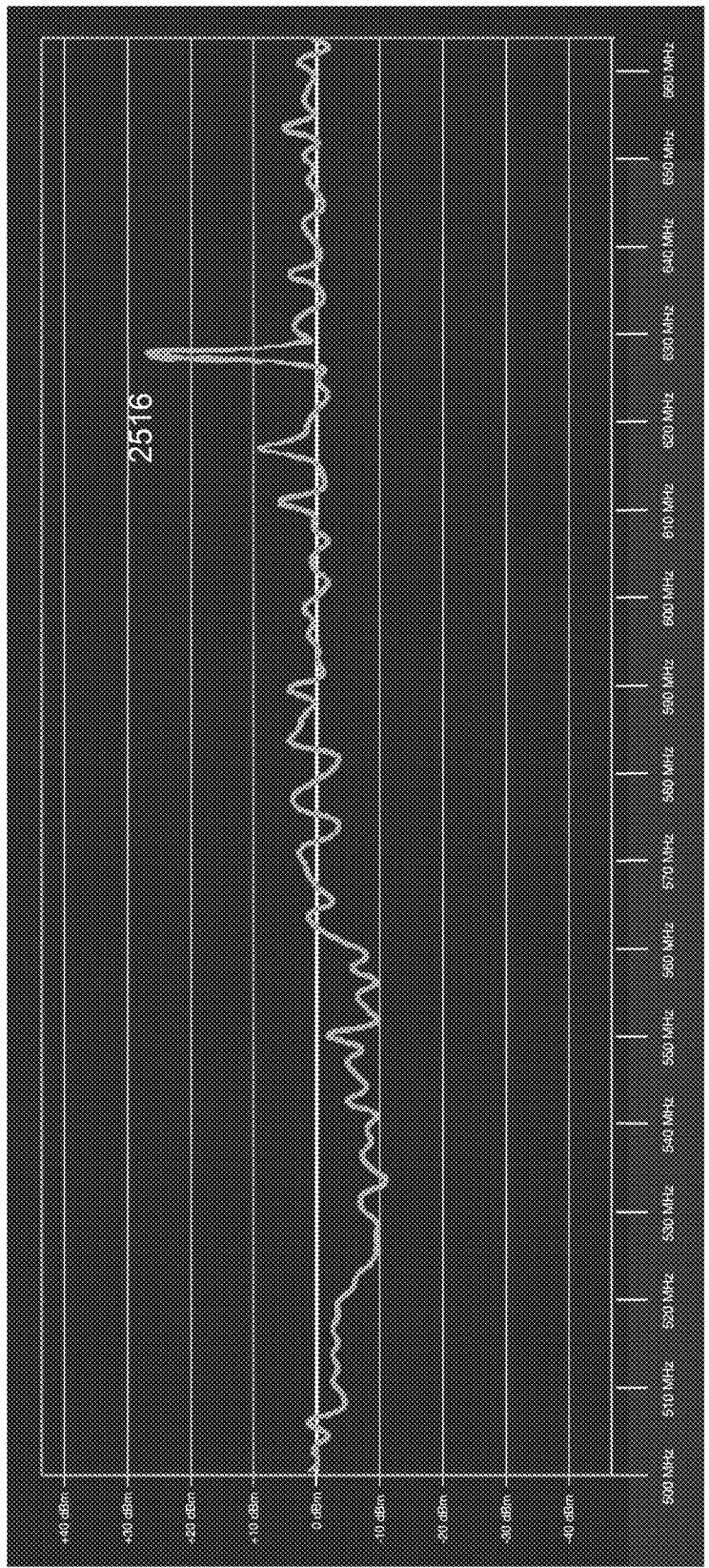

Changes in RF conditions over time are displayed in the waterfall chart 2505, topographic chart 2507, delta chart 2509, and spectrum trace view 2511, which are shown in detail in FIGS. 25B-25D, respectively. The waterfall chart 2505 takes each scan from a particular frequency range (e.g., 500 Mhz up to 660 MHz), and stacks each successive scan on top of other previous scans over time. The center of the waterfall chart 2505 in the 580 MHz range displays a red line 2512 and a green band 2513, which means the venue is exhibiting more RF energy concentrated over time at that range, compared to the blue 2515, which indicates much lower and/or no RF activity at those frequencies. The waterfall chart 2505 can therefore graphically illustrate over time how the environment is changing.

Referring to the topographic chart 2507, the chart graphs accumulated data as a function of frequency. For example, the topographic chart 2507 can display blocks if there is a high powered signal over time. For example, the topographic chart 2507 shows bursts in red at the 570-600 MHz range.

Referring to the delta chart 2509, the delta chart 2509 can be generated by looking at each successive scan over time and displaying the difference. For example, if all of a sudden there is one large spike in a particular RF scan, the spike won't show up in the graph. But if there is a strong signal in one RF scan that leaves and new signal comes in during a subsequent RF scan, then the delta chart 2509 will display a spike representative of the change like at the event captured at spike 2516. The delta chart 2509 can therefore be used to identify interference events. The spectrum trace view 2511 shows each scan as it comes into the database, and therefore the trace view 2511 can be continuously changing as new RF scan data is received.

As an illustrative example of the historical scan data functionality disclosed herein is for a house of worship facility. Typically, for example, worship services occur on a weekly basis and are routinely challenged by the dynamic nature of the RF environment. Frequency coordination and equipment configuration most often will occur during the week, when the house of worship is unoccupied. When services begin on Sunday, the RF environment has often fundamentally changed, which can result in signal dropout or interference events for wireless audio systems. With this user interface, a technician can search back through previous Sundays using controller 2503 and gather spectrum data to provide the most accurate RF scan sets for frequency coordination and wireless equipment selection for future services.

Figure 26:
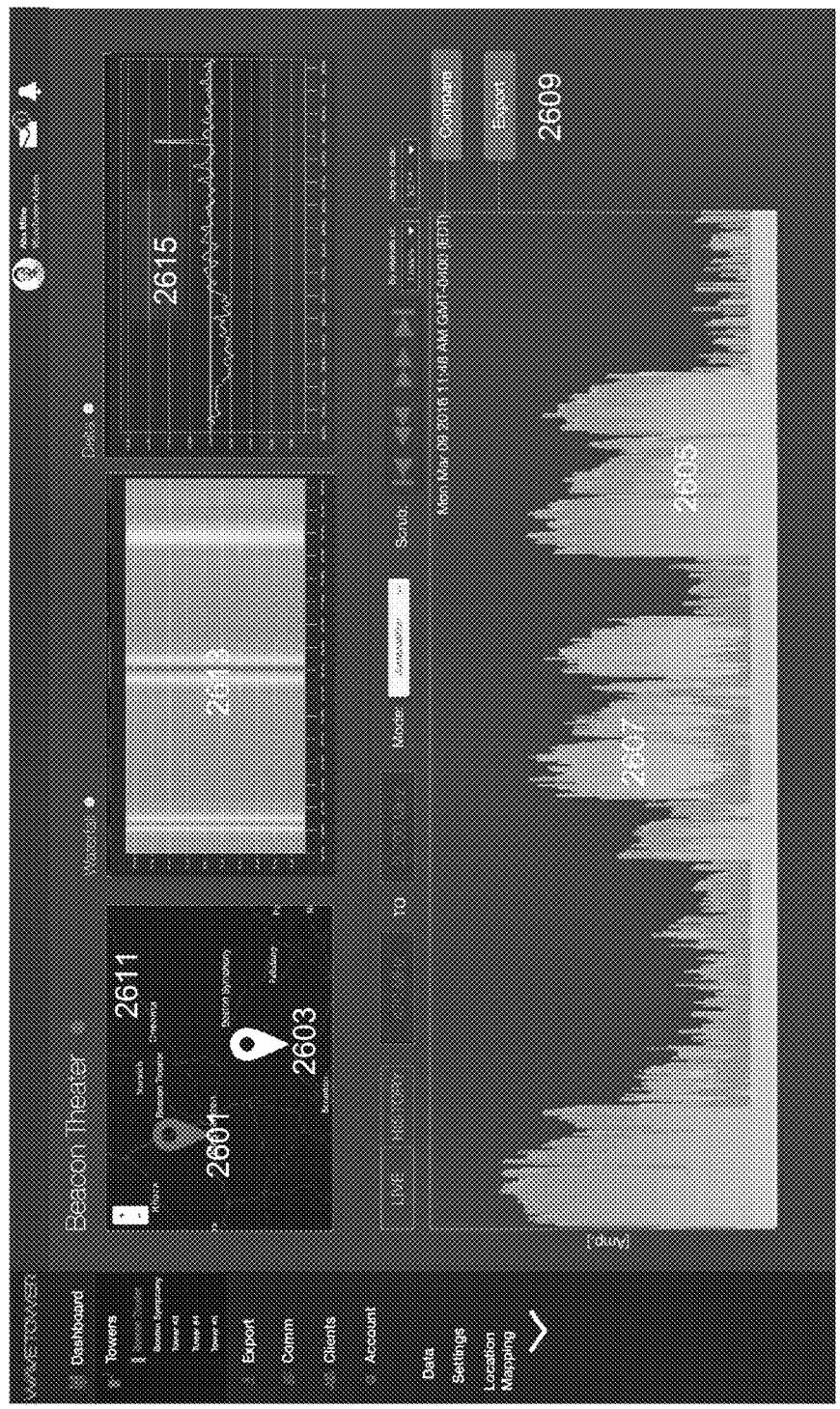
FIG. 26 is an exemplary graphical user interface with overlaid RF scan data from multiple locations, in accordance with embodiments of the present invention.

Referring to FIG. 26, FIG. 26 shows overlaid RF scan data from multiple locations. FIG. 26 includes a geographical map 2611 (e.g., described in conjunction with FIG. 24), a waterfall chart 2613, and a delta chart 2615 (e.g., described in conjunction with FIGS. 25A-D). Scan data from multiple locations 2601 and 2603 can be used to calculate interference-free frequency sets compatible at each location, enabling wireless equipment that will be functional in multiple locations without expensive and complex onsite RF engineering work. In addition to displaying multiple locations and comparing RF scan data, the graphical user interface can display selected scans from multiple periods in time from a single location, which can allow changes to the local RF environment to be analyzed over time. For example, a technician in a house of worship can look at multiple scan periods such as Sunday services from the past weeks or months and overlay them to visually compare results. In this example graphical user interface shown in FIG. 26, green scan 2605 is the present RF environment with previous Sunday's environment overlaid in blue 2607. With this information, for example, a technician untrained in RF engineering can identify changes to the RF environment over time and enable improved outcomes for her wireless system. For further analysis or for integration with third party software systems, a user can export current and historical scan data via export control 2609.

Figure 27A:
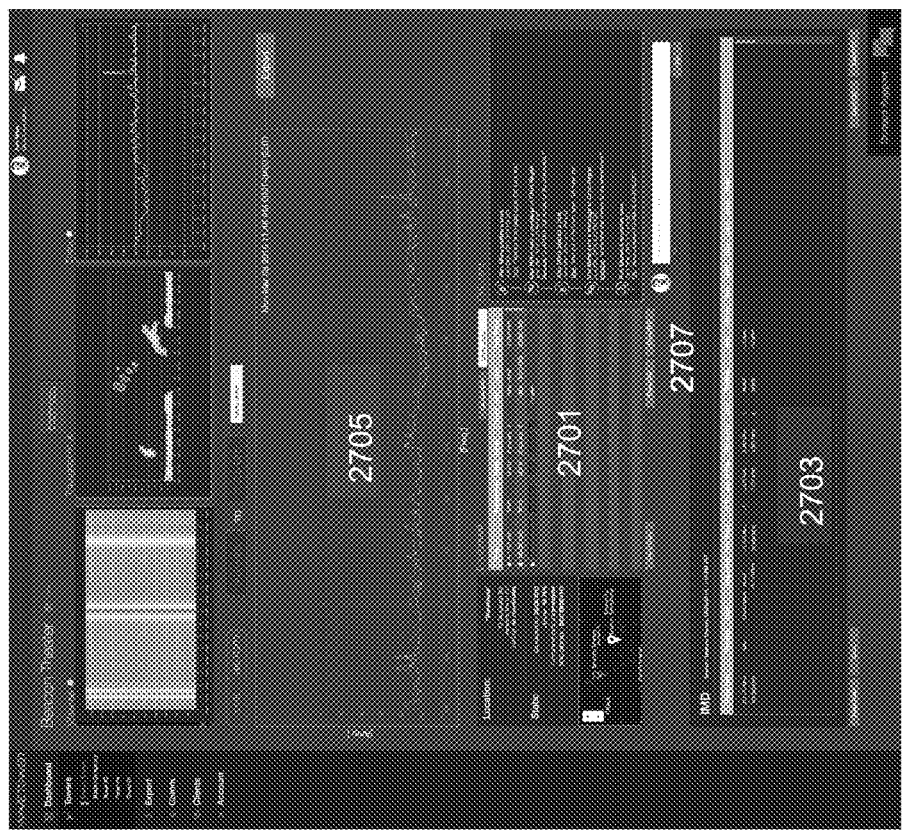
FIG. 27A-C is an exemplary graphical user interface for calculating frequency sets and based on RF sensor scan data and equipment profiles, in accordance with embodiments of the present invention.
Figure 27B:
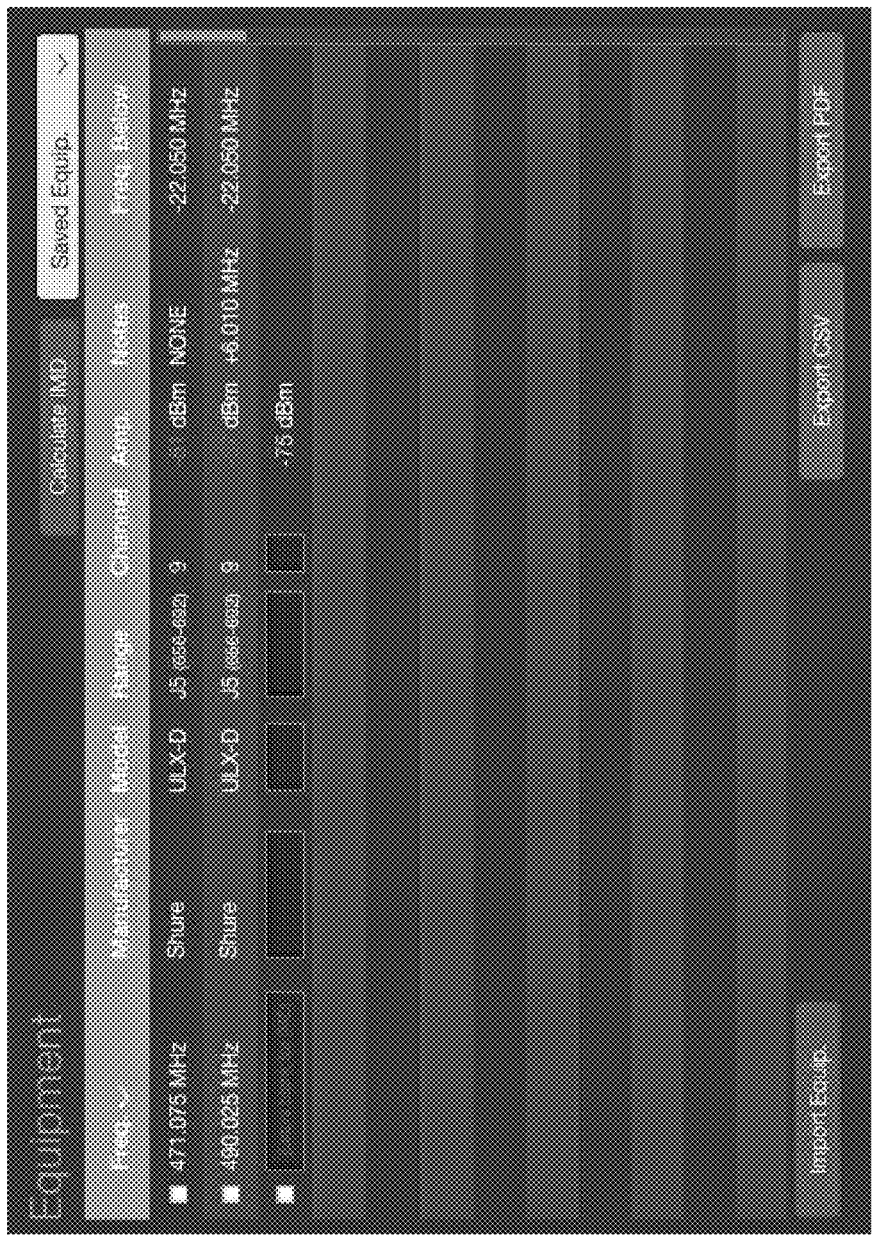
Figure 27C:
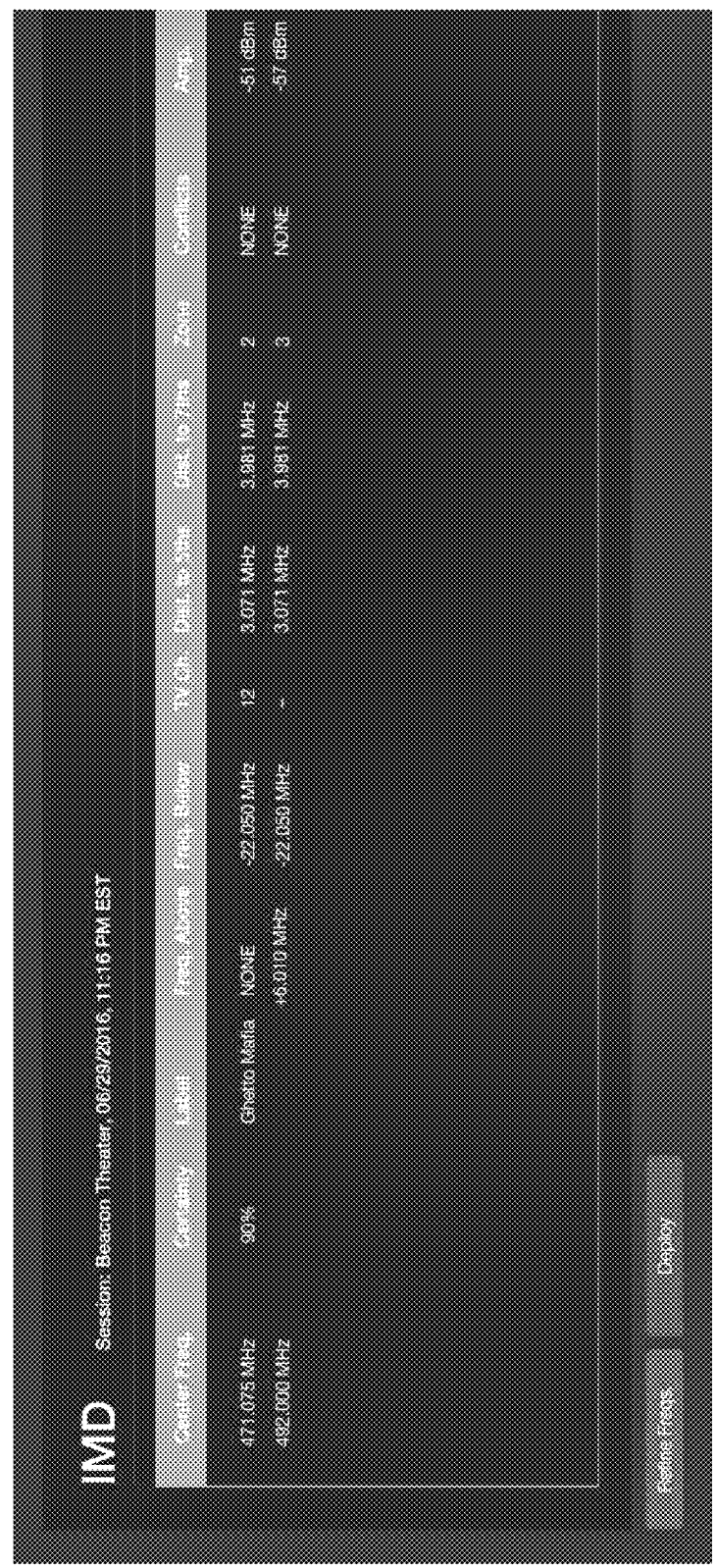

Referring now to FIGS. 27A-C, FIG. 27A shows an exemplary graphical user interface for calculating frequency sets and based on RF sensor scan data and equipment profiles. In addition to the components described in conjunction with FIGS. 25A-D, FIGS. 27 and 27A show an equipment profile 2701 with upper and lower limit frequency ranges for each wireless audio unit such as a microphone receiver. The equipment profile 2701 shows, for each device, the frequency of the device (e.g., 471.075 MHz), the manufacturer of the device (e.g., Shure), the model of the device (e.g., ULX-D), the range of the device (e.g., J5 (656-692)), the channel of the device (e.g., 9), the amps (e.g., −51 dBm), notes (if any), and the frequency below (e.g., −22.050 MHz). Nearest coordinated frequency below (negative) or above is an indication of how close the nearest frequency is to that listed equipment's frequency, assisting in identifying signals that are too close or could potentially cause interference. The equipment profile 2701 can be used to select one or more audio units, and the upper and lower limit frequency ranges are provided as an input to intermodulation distortion calculator controller 2703. Controller 2703 performs calculations to allocate frequencies that are on unoccupied frequencies and also free from intermodulation distortion to equipment listed on 2701. Each entry in 2703 can include a center frequency (e.g., 471.075 MHz), a percentage certainty (e.g., 90%, which references the probability of intermodulation-free interference based on the intermodulation calculation), a label (e.g., Ghetto Mafia for a performer or other talent name associated with that equipment), a frequency above (if any, to show closest calculated frequency above the target frequency of this equipment listing), a frequency below (e.g., −22.050 MHz, to show the nearest calculated frequency below the target frequency of this equipment listing), a TV channel (e.g., 12), a distance to 5ths (e.g., 3.071 MHz, based on a calculated fifth order harmonic from the target frequency), a distance to 7ths (e.g., 3.981 MHz, based on a calculated seventh order harmonic from the target frequency), a zone (e.g., 2, if multiple zones of wireless equipment are deployed across a facility and need to be noted), conflicts (if any of scanned third party frequencies present), signal amplitude (Amps)(e.g., −51 dBm, based on last scan's captured signal level of the target frequency in this equipment listing), a channel (which may correspond to the given equipment's tuning function for channels e.g. 1, 2, 3 or A, B, C), and one or more additional labels and/or notes. As an example, a user untrained in frequency coordination and intermodulation calculation can, from a remote location, access RF scan data 2705 to automatically generate a list of compatible frequencies for equipment listed in 2701. This frequency list can be exported for third party software application import or shared via controls 2707. In some examples, frequencies may be deployed via application programming interface to authorized third party equipment such as wireless microphones, in-ear monitors, or other wireless communications equipment. This can allow, for example, a technician at a central office location to remotely monitor and also change frequencies for remotely located equipment, eliminating the need for travel to the remote site. With the export and sharing capability, those frequencies may be easily sent to an onsite technician if manual programming is preferred.

Figure 28:
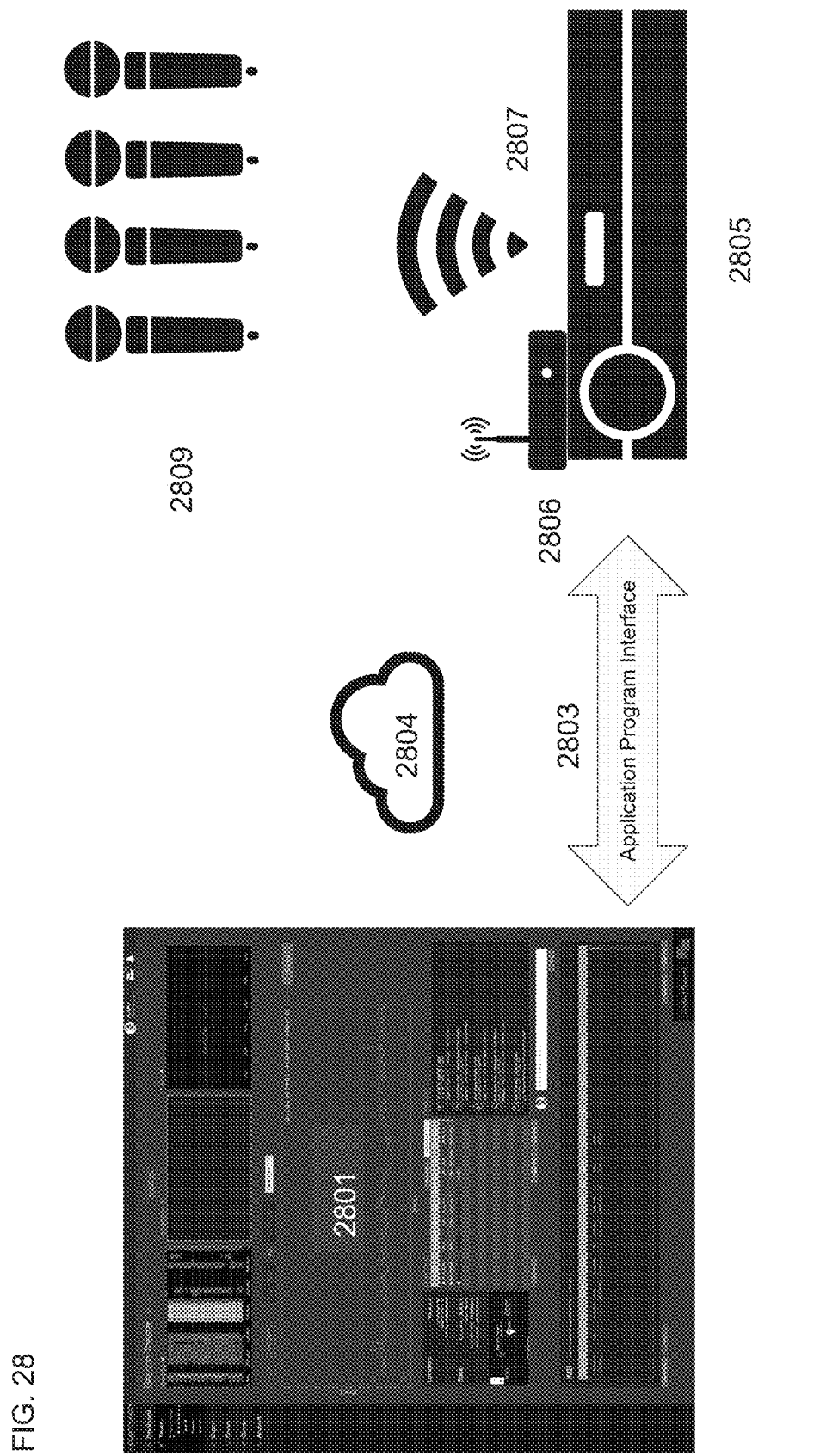
FIG. 28 is an exemplary diagram demonstrating an application program interface between an exemplary web application and wireless audio receivers and transmitters, in accordance with embodiments of the present invention.

Referring now to FIG. 28, FIG. 28 FIG. 28 shows an exemplary diagram demonstrating an application program interface between an exemplary web application and wireless audio receivers and transmitters. The application program interface (API) 2803 establishes a connection over a secure internet connection 2804 between web application 2801 (e.g., the graphical user interface shown in FIGS. 24-28) and RF sensor module 2806. In some examples, the API may alternatively establish connection directly to wireless microphone receiver 2805. The API connection may first provide handshake connection to begin communication between RF sensor module 2806 or wireless receiver 2805 and web application 2801. Once a connection is established, local RF spectrum data is continuously gathered by RF sensor 2806 and sent to web application 2801 for analysis and management by a user or by an automated script. From web application 2801, a user may calculate compatible frequency sets for wireless microphone transmitters 2809 based on local RF conditions gathered by RF sensor module 2806. These sets of frequencies may be sent via API 2803 to wireless microphone receiver 2805. Wireless microphone receiver 2805 may be configured to remotely deploy those frequencies to wireless microphone transmitters 2809 via RF connection or infrared connection 2807. This allows a remote technician untrained in RF coordination to monitor, manage, and ultimately control frequencies of wireless microphone systems. RF sensor module 2806 may be directly integrated into wireless microphone receiver 2805 circuitry or connect via wired or wireless local area network connection or other data connection. API 2803 may also communicate wireless microphone receiver RF or audio signal level to web application 2801 in addition to local RF spectrum scan data.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. The computer program can include, for example, web application software, scanning software, RF data analysis software (e.g., including the frequency allocation and intermodulation program), and user interface software. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers 115 at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor receives instructions and data from a read only memory or a random access memory or both. The essential elements of a computer are a processor for executing instructions and one or more memory devices for storing instructions and data. Generally, a computer also includes, or is operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. See, for example, the interface shown in FIG. 4. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the embodiments of the present invention are not limited in its application to the details of construction and to the arrangements of the components set forth in the following description or illustrated in the drawings. The embodiments of the present invention are capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the embodiments of the present invention. It is important, therefore, that the claims be regarded as including such equivalent constructions insofar as they do not depart from the spirit and scope of the embodiments of the present invention.

Although the embodiments of the present invention have been described and illustrated in the foregoing exemplary embodiments, it is understood that the present disclosure has been made only by way of example, and that numerous changes in the details of implementation of the embodiments of the present invention may be made without departing from the spirit and scope of the embodiments of the present invention, which are limited only by the claims which follow.

The invention claimed is:

1. A computerized method for analyzing radio frequency (RF) data, the method comprising:
 receiving, by a processing unit, RF data from one or more wideband RF sensors, wherein:
  the one or more wideband RF sensors are remotely located from the processing unit; and
  the one or more wideband RF sensors are configured to communicate with the processing unit to provide the RF data to the processing unit;
 storing, in a database in communication with the processing unit, a set of available equipment types and data regarding the operating characteristics of each of the equipment types in the set of available equipment types;
 receiving, by the processing unit via a user interface associated with the processing unit, data indicative of (a) a selection of an equipment type of a set of available equipment types stored in the database, and (b) a number of devices of the equipment type that a user is planning for use in a venue associated with the one or more wideband RF sensors;

determining, by the processing unit, a particular frequency range associated with the equipment type based on operating characteristics of the equipment type stored in the database, wherein the particular frequency range comprises a plurality of frequencies that an audio device of the equipment type can be selectably configured to operate at by a user;

analyzing, by the processing unit, the RF data at the particular frequency range to calculate one or more recommended frequencies to display to a user, comprising:

determining one or more open frequencies not in use based on the RF data and a signal level threshold;

calculating a recommended frequency for each of the number of devices for a user for selectively configuring the number of devices to operate at based on the one or more open frequencies, wherein each of the recommended frequencies reduces a potential for interferences than other frequencies in the frequency range; and displaying the recommended frequencies for each of the number of devices via the user interface.

2. The method of claim 1, wherein the RF data is collected over the particular frequency range and a resolution bandwidth.

3. The method of claim 1, further comprising:
receiving a first set of RF data from a first wideband RF sensor at a first venue;
receiving a second set of RF data from a second wideband RF sensor, that is different than the first wideband RF sensor, at a second venue that is different than the first venue;
calculating a first set of recommended frequencies for each of the number of devices for the first venue; and
calculating a second set recommended frequencies for each of the number of devices for the second venue that is different than the first set of recommended frequencies.

4. The method of claim 1, further comprising:
receiving a first set of RF data from a first wideband RF sensor at a first venue;
receiving a second set of RF data from a second wideband RF sensor, that is different than the first wideband RF sensor, at the first venue;
calculating the one or more recommended frequencies for the first venue based on the first set of RF data and second set of RF data.

5. The method of claim 1, further comprising receiving geographical position information from each of the one or more wideband RF sensors.

6. The method of claim 5, wherein the geographical position information comprises an indication of latitudinal and longitudinal coordinates of each of the one or more wideband RF sensors.

7. The method of claim 6, further comprising:
generating a positional map of the one or more wideband RF sensors based on the geographical position information;
generating an RF map based on the RF data; and
displaying the positional map, the RF map, and the one or more recommended frequencies.

8. The method of claim 1, wherein the one or more wireless audio devices comprise one or more wireless microphones for projecting sound received by each of the one or more wireless microphones through a venue in which the one or more wideband RF sensors are disposed.

9. The method of claim 8, wherein the plurality of frequencies that the one or more wireless microphones can be selectably configured to operate at by a user are less than 2 GHz.

10. The method of claim 8, wherein the plurality of frequencies that the one or more wireless microphones can be selectably configured to operate at by a user are within an ultra high frequency (UHF) band.

11. The method of claim 8, wherein the one or more wireless microphones comprise a first wireless microphone and a second wireless microphone, and calculating one or more recommended frequencies further comprises calculating a first frequency for the first wireless microphone and a second frequency for the second wireless microphone different from the first frequency.

12. The method of claim 8, wherein calculating further comprises calculating the one or more recommended frequencies for a user to selectively configure each of the one or more wireless audio microphones to use one of the one or more recommended frequencies during a liver performance occurring on a particular day and time period at a venue in which the one or more wideband RF sensors are disposed.

13. An apparatus comprising a processor in communication with a memory configured to:
receive RF data from one or more wideband RF sensors, wherein:
the one or more wideband RF sensors are remotely located from the processing unit; and
the one or more wideband RF sensors are configured to communicate with the processing unit to provide the RF data to the processing unit;
store, in a database in communication with the processor, a set of available equipment types and data regarding the operating characteristics of each of the equipment types in the set of available equipment types;
receive, via a user interface associated with the apparatus, data indicative of (a) a selection of an equipment type of a set of available equipment types stored in the database, and (b) a number of devices of the equipment type that a user is planning for use in a venue associated with the one or more wideband RF sensors;
determine a particular frequency range associated with the equipment type based on operating characteristics of the equipment type stored in the database, wherein the particular frequency range comprises a plurality of frequencies that an audio device of the equipment type can be selectably configured to operate at by a user;
analyze the RF data at the particular frequency range to calculate one or more recommended frequencies to display to a user, comprising:
determining one or more open frequencies not in use based on the RF data and a signal level threshold;
calculating a recommended frequency for each of the number of devices for a user for selectively configuring the number of devices to operate at based on the one or more open frequencies, wherein each of the recommended frequencies reduces a potential for interferences than other frequencies in the frequency range; and
displaying the recommended frequencies for each of the number of devices via the user interface.

14. The apparatus of claim 13, further configured to:
receive a first set of RF data from a first wideband RF sensor at a first venue;
receive a second set of RF data from a second wideband RF sensor, that is different than the first wideband RF sensor, at the first venue;
calculate the one or more recommended frequencies for the first venue based on the first set of RF data and second set of RF data.

15. The apparatus of claim 13, further configured to:
receive geographical position information from each of the one or more wideband RF sensors, wherein the geographical position information comprises an indication of latitudinal and longitudinal coordinates of each of the one or more wideband RF sensors;
generate a positional map of the one or more wideband RF sensors based on the geographical position information;
generate an RF map based on the RF data; and
display the positional map, the RF map, and the one or more recommended frequencies.

16. The apparatus of claim 13, wherein the one or more wireless audio devices comprise one or more wireless microphones for projecting sound received by each of the one or more wireless microphones through a venue in which the one or more wideband RF sensors are disposed.

17. A computer readable storage device having stored thereon instructions, which, when executed, perform a method comprising:
receiving RF data from one or more wideband RF sensors, wherein:
the one or more wideband RF sensors are remotely located from the processing unit; and
the one or more wideband RF sensors are configured to communicate with the processing unit to provide the RF data to the processing unit;
storing, in a database, a set of available equipment types and data regarding the operating characteristics of each of the equipment types in the set of available equipment types;
receiving, via a user interface, data indicative of (a) a selection of an equipment type of a set of available equipment types stored in the database, and (b) a number of devices of the equipment type that a user is planning for use in a venue associated with the one or more wideband RF sensors;
determining a particular frequency range associated with the equipment type based on operating characteristics of the equipment type stored in the database, wherein the particular frequency range comprises a plurality of frequencies that an audio device of the equipment type can be selectably configured to operate at by a user;
analyzing, by the processing unit, the RF data at the particular frequency range to calculate one or more recommended frequencies to display to a user, comprising:
determining one or more open frequencies not in use based on the RF data and a signal level threshold;
calculating a recommended frequency for each of the number of devices for a user for selectively configuring the number of devices to operate at based on the one or more open frequencies, wherein each of the one or more recommended frequencies reduces a potential for interferences than other frequencies in the frequency range; and
displaying the recommended frequencies for each of the number of devices via the user interface.

18. The computer readable storage device of claim 17, the method further comprising:
receiving a first set of RF data from a first wideband RF sensor at a first venue;
receiving a second set of RF data from a second wideband RF sensor, that is different than the first wideband RF sensor, at the first venue;
calculating the one or more recommended frequencies for the first venue based on the first set of RF data and second set of RF data.

19. The computer readable storage device of claim 17, the method further comprising:
receiving geographical position information from each of the one or more wideband RF sensors, wherein the geographical position information comprises an indication of latitudinal and longitudinal coordinates of each of the one or more wideband RF sensors;
generating a positional map of the one or more wideband RF sensors based on the geographical position information;
generating an RF map based on the RF data; and
displaying the positional map, the RF map, and the one or more recommended frequencies.

20. The computer readable storage device of claim 17, wherein the one or more wireless audio devices comprise one or more wireless microphones for projecting sound received by each of the one or more wireless microphones through a venue in which the one or more wideband RF sensors are disposed.

* * * * *